(12) United States Patent
Kobayashi et al.

(10) Patent No.: US 7,474,699 B2
(45) Date of Patent: Jan. 6, 2009

(54) MOVING PICTURE ENCODING/TRANSMISSION SYSTEM, MOVING PICTURE ENCODING/TRANSMISSION METHOD, AND ENCODING APPARATUS, DECODING APPARATUS, ENCODING METHOD DECODING METHOD AND PROGRAM USABLE FOR THE SAME

(75) Inventors: Mitsuru Kobayashi, Yokohama (JP); Minoru Etoh, Yokohama (JP); Shunichi Sekiguchi, Yamato (JP); Hiroyuki Yamaguchi, Yokohama (JP); Satoru Adachi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 889 days.

(21) Appl. No.: 10/486,362

(22) PCT Filed: Aug. 28, 2002

(86) PCT No.: PCT/JP02/08659

§ 371 (c)(1), (2), (4) Date: Jul. 7, 2004

(87) PCT Pub. No.: WO03/021971

PCT Pub. Date: Mar. 13, 2003

(65) Prior Publication Data
US 2004/0233989 A1 Nov. 25, 2004

(30) Foreign Application Priority Data
Aug. 28, 2001 (JP) ............................. 2001-258800
Apr. 4, 2002 (JP) ............................. 2002-103062

(51) Int. Cl.
*H04N 7/12* (2006.01)
*H04B 1/66* (2006.01)

(52) U.S. Cl. ............................. 375/240.16; 375/240.03

(58) Field of Classification Search ................ 348/411, 348/394.1, 395.1, 403.1, 404.1, 408.1, 409.1, 348/414.1, 424.1, 424.2, 418.1, 420.1, 422.1, 348/421.1, 430.1; 382/233, 238, 239, 243, 382/244, 245, 246, 248, 250, 236, 251; 375/240.26, 375/240.16, 240.12, 240.24, 240.18, 240.2, 375/240.23, 240.25, 240.03
See application file for complete search history.

(56) References Cited

U.S. PATENT DOCUMENTS 5,963,673 A * 10/1999 Kodama et al. ............ 382/239

(Continued)

FOREIGN PATENT DOCUMENTS

CN 1206994 A 2/1999

(Continued)

*Primary Examiner*—Behrooz Senfi
(74) *Attorney, Agent, or Firm*—Oblon, Spivak, McClelland, Maier & Neustadt, P.C.

(57) ABSTRACT

An encoder which encodes each of image blocks of a video. The encoder includes a prediction mode selection information generator for generating prediction mode selection information which indicates that a first prediction mode for reducing temporal redundancy is applied to each of second image blocks or that a second prediction mode for reducing spatial redundancy is applied to each of the second image blocks. The second image blocks are obtained by dividing first image blocks. The encoder includes a predictive residual signal generator for generating a predictive residual signal by applying the selected first or second prediction mode to each of the second image blocks. The encoder includes a transmitter for transmitting the prediction mode selection information in association with the predictive residual signal.

42 Claims, 19 Drawing Sheets

U.S. PATENT DOCUMENTS

| | | |
|---|---|---|
| 6,493,385 B1 | 12/2002 | Sekiguchi et al. |
| 6,859,559 B2 * | 2/2005 | Boon et al. .................. 382/238 |
| 6,898,241 B2 * | 5/2005 | Vetro .................... 375/240.12 |
| 7,020,196 B2 * | 3/2006 | Suzuki et al. .......... 375/240.12 |
| 7,116,714 B2 * | 10/2006 | Hannuksela ........... 375/240.12 |
| 7,280,597 B2 * | 10/2007 | Zhang et al. ........... 375/240.16 |
| 7,324,595 B2 * | 1/2008 | Cote et al. ............. 375/240.12 |
| 2002/0168007 A1 * | 11/2002 | Lee ....................... 375/240.03 |

FOREIGN PATENT DOCUMENTS

| | | |
|---|---|---|
| JP | 63-121372 | 5/1988 |
| JP | 2000-102016 | 4/2000 |
| JP | 2001-500688 | 1/2001 |
| JP | 2001-36912 | 2/2001 |
| WO | WO 99/22525 | 5/1999 |

* cited by examiner

| PICTURE TYPE | MB TYPE | NAME | COD | MCBPC | CBPY | DQUANT | MVD | MVD2-4 |
|---|---|---|---|---|---|---|---|---|
| INTER | NOT CODED | — | X | | | | | |
| INTER | 0 | INTER | X | X | X | | X | |
| INTER | 1 | INTER + Q | X | X | X | X | X | |
| INTER | 2 | INTER 4V | X | X | X | | X | X |
| INTER | 3 | INTRA | X | X | X | | | |
| INTER | 4 | INTRA + Q | X | X | X | X | | |
| INTER | 5 | INTER 4V + Q | X | X | X | X | X | X |
| INTER | 6 | INTRA / INTER | X | X | X | X | X | |
| INTER | 7 | INTRA / INTER + Q | X | X | X | X | X | |
| INTER | STUFFING | — | | | | | | |
| INTRA | 3 | INTRA | | X | X | | | |
| INTRA | 4 | INTRA + Q | | X | X | X | | |
| INTRA | STUFFING | — | | X | | | | |

NOTE - "X" MEANS THAT THE ITEM IS PRESENT IN THE MACRO BLOCK.

(b)

| BTYPE | INTRADC | TCOEF |
|---|---|---|

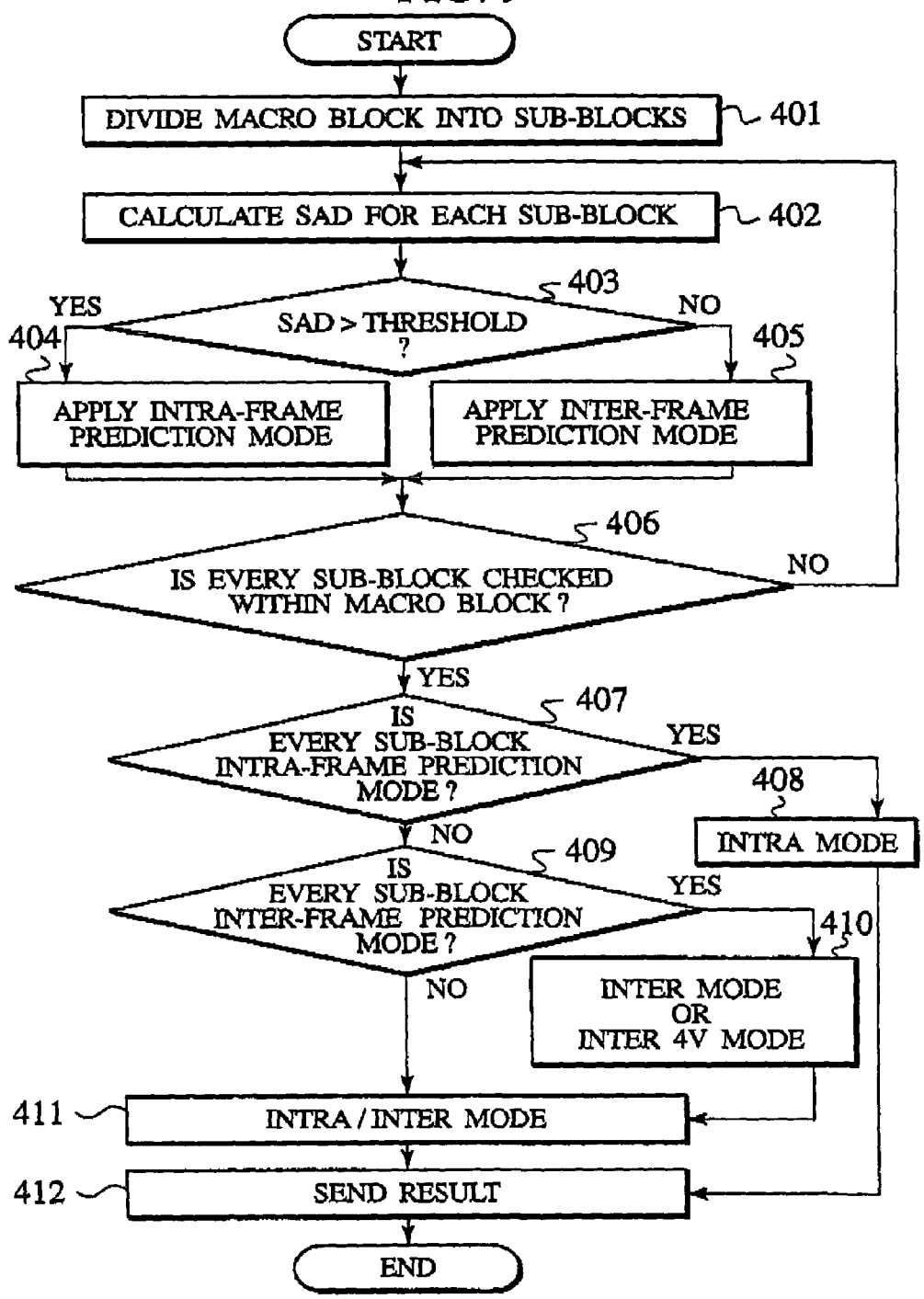

FIG. 12
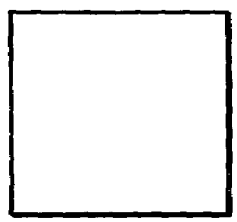
16×16
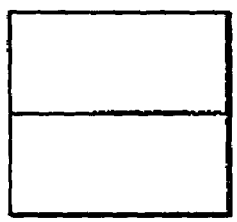
16×8
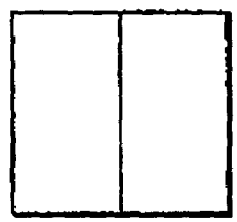
8×16
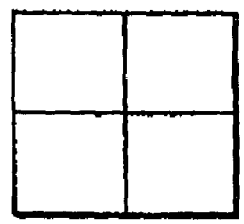
8×8
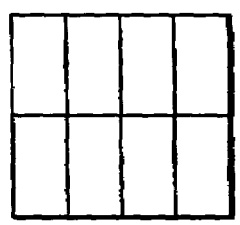
4×8
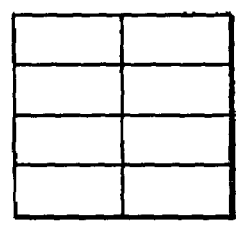
8×4
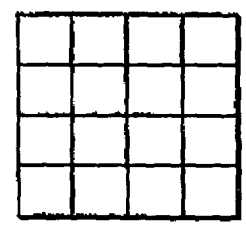
4×4

| PICTURE TYPE | MB TYPE | NAME | Intra_pred_mode | Ref_frame | MV | CBP |
|---|---|---|---|---|---|---|
| INTER | 0 | INTER 16x16 | | X | 1X1 | X |
| INTER | 1 | INTER 16x8 | | X | 1X2 | X |
| INTER | 2 | INTER 8x16 | | X | 2X1 | X |
| INTER | 3 | INTER 8x8 | | X | 2X2 | X |
| INTER | 4 | INTER 8x4 | | X | 2X4 | X |
| INTER | 5 | INTER 4x8 | | X | 4X2 | X |
| INTER | 6 | INTER 4x4 | | X | 4X4 | X |
| INTRA | 7 | INTRA/INTER | X | X | 1X1 | X |
| INTRA | 8 | INTRA 16x16 | X | | | X |
| ... | | ... | | | | |

NOTE-"X" MEANS THAT THE ITEM IS PRESENT IN THE MACRO BLOCK.

(b)

| DC_PRED | 0 |
|---|---|
| DIAG_PRED_RL | 1 |
| VERT_PRED | 2 |
| DIAG_PRED_LR_45 | 3 |
| HOR_PRED | 4 |
| DIAG_PRED_LR | 5 |
| INTER_PRED | 6 |

FIG. 17

| CODE NUMBER | REFERENCE FRAME | Intra-pred-mode | MVD |
|---|---|---|---|
| 0 | THE LAST DECODED FRAME (1 FRAME BACK) | | × |
| 1 | 2 FRAME BACK | | × |
| 2 | 3 FRAME BACK | | × |
| 3 | 4 FRAME BACK | | × |
| 4 | 5 FRAME BACK | | × |
| 5 | INTRA | × | |

MOVING PICTURE ENCODING/TRANSMISSION SYSTEM, MOVING PICTURE ENCODING/TRANSMISSION METHOD, AND ENCODING APPARATUS, DECODING APPARATUS, ENCODING METHOD DECODING METHOD AND PROGRAM USABLE FOR THE SAME

TECHNICAL FIELD

The present invention relates to a video coding transmission system and a video coding transmission method, and relates to an encode, a decoder, an encoding method, a decoding method, and a program which are suitable for use in the same this application is a U.S. national phase of international application, 371 of PCT/JP02/08659, filed Aug. 28, 2002.

BACKGROUND ART

A description will be given of examples of an encoder and a decoder used in a conventional video coding transmission system with reference to FIGS. 1 and 2. FIG. 1 is a block diagram showing a schematic configuration of the encoder used in the conventional video coding transmission system. FIG. 2 is a block diagram showing a schematic configuration of the decoder used in the conventional video coding transmission system.

The encoder 120 shown in FIG. 1 and the decoder 140 shown in FIG. 2 are a digital video encoder and a digital video decoder, respectively, which are compliant with the H.263 coding system described in ITU-T Recommendation H.263 "Video coding for low bit rate communication".

The encoder 120 reduces temporal redundancy by the motion compensated inter-frame prediction and reduces spatial redundancy by orthogonal transformation (for example, DCT: Discrete Cosine Transform), so as to perform information compressing and encoding for an input video signal 2 as a digital video.

An inputting section 121 receives the input video signal 2, namely, a time sequence of frame images. Herein, in the encoder 120, a frame image which is now being encoded is referred to as a "current frame".

The inputting section 121 divides the "current frame" into square regions ("macro blocks (first image blocks)") of 16×16 pixels and sequentially sends the "macro blocks" to a motion estimating section 122 and a subtracting section 124. Herein, a "macro block" which is now being encoded is referred to as a "current macro block".

The motion estimating section 122 estimates "motion vectors" and determines "macro block modes (described later)" on a macro block basis.

The motion estimating section 122 finds out a portion ("motion prediction data") similar to the current macro block in a predetermined search area of a frame image (referred to as a "reference frame") which was encoded in past and stored in a frame memory 132, and estimates an amount of two-dimensional spatial motion from the current macro block to "motion prediction data" as a "motion vector".

For example, the motion estimating section 122 can perform the aforementioned estimation of "motion vectors" using a "block matching". Specifically, the motion estimating section 122 sets the search area around a spatial position of the current macro block in the "reference frame" within the frame memory 132, and calculates the "sum of squares of differences" or the "sum of absolute differences" between image data within the search area and the current macro block. The motion estimating section 122 then obtains image data that minimizes the calculated "sum of squares of differences" or "sum of absolute differences" within the search area, as the "motion prediction data". And the motion estimating section 122 estimates the amount of two-dimensional spatial motion from the current macro block to the "motion prediction date" as the "motion vector".

The motion estimating section 122 sends the estimated "motion vector" to a motion compensating section 123 and a variable length encoding section 127.

The motion estimating section 122 determines a "macro block mode" applied to the current macro block. Herein, the "macro block mode" indicates a method ("prediction mode", the number of motion vectors, eta.) of generating a "predictive residual signal (described later)" for the current macro block. As shown in FIG. 3, the macro block mode includes the "INTRA mode (the intra-frame prediction mode is applied)", "INTER mode (the inter-frame prediction mode is applied)", and "INTER 4V mode (the inter-frame prediction mode with four motion vectors is applied)".

The "prediction mode" indicates application of the "inter-frame prediction mode" which reduces the temporal redundancy or application of the "intra-frame prediction mode" which reduces the spatial redundancy for the current macro block.

Specifically, the motion estimating section 122 selects a "macro block mode" that minimizes the power of the predictive residual signal (described later) among the "INTRA mode", "INTER mode", and "INTER 4V mode" based on the estimated "motion vector".

The motion estimating section 122 sends the determined "macro block mode" to the motion compensating section 123 and the variable length encoding section 127.

The motion compensating section 123 sends "control information" obtained based on the "macro block mode" and the "motion vector" sent from the motion estimating section 122, to the subtracting section 124.

For example, when the "macro block mode" sent from the motion estimating section 122 is the "INTRA mode", the motion compensating section 123 notifies the subtracting section 124 of only the received "macro block mode (INTRA mode)" as the "control information" without forming a "predicted image block (described later)", namely, without performing the motion compensated inter-frame prediction for the "current macro block".

When the "macro block mode" received from the motion estimating section 122 is the "INTER mode" or "INTER 4V mode", the motion compensating section 123 performs the motion compensated inter-frame prediction for the current macro block using the "motion vector" sent from the motion estimating section 122 and the reference frame stored in the frame memory 132, so as to form the "predicted image block".

Herein, in the "INTER mode", one motion vector is assigned to a macro block of 16×16 Pixels. In the "INTER 4V mode", one motion vector is assigned to a sub-block of 8×8 pixels.

The motion compensating section 123 sends the "predicted image block", the "macro block mode", and the "motion vector" to the subtracting section 124 as the "control information". Moreover, the motion compensating section 123 sends the "predicted image block" to an adding section 131.

The subtracting section 124 sends predetermined information to an orthogonal transforming section 125 according to the "control information" sent by the motion compensating section 123.

Specifically, when the "macro block mode" is the "INTER mode" or "INTER 4V mode", the subtracting section 124 reduces the temporal redundancy between temporally consecutive macro blocks, by obtaining a difference between the "current macro block" sent from the inputting section 121 and the "predicted image block" sent from the motion compensating section 123.

Herein, the difference obtained by the subtracting section 124 is referred to as the "predictive residual signal". The subtracting section 124 sends this "predictive residual signal" to the orthogonal transforming section 125.

When the "macro block mode" is the "INTRA mode", the subtracting section 124 sends the "current macro block" sent from the inputting section 124, to the orthogonal transforming section 125, because the "predictive residual signal" for the "predicted image block" is not sent from the motion compensating section 123.

The orthogonal transforming section 125 reduces the spatial redundancy within the "predictive residual signal", by performing orthogonal transformation (for example. DCT) in sub-blocks of 8×8 pixels for the "predictive residual signal" sent from the subtracting section 124.

The orthogonal transforming section 125 sends "orthogonal transformation coefficients (for example, DCT coefficients)" obtained by the orthogonal transformation, to a quantizing section 126.

The quantizing section 126 quantizes the "orthogonal transformation coefficients" sent from the orthogonal transforming section 125. The quantizing section 126 then sends the "quantized orthogonal transformation coefficients" obtained by the quantization, to the variable length encoding section 127 and a dequantizing section 129.

The variable length encoding section 127 performs variable length encoding for the "quantized orthogonal transformation coefficients" sent by the quantizing section 126, and the "motion vector" and "macro block mode" sent from the motion estimating section 122, and multiplexes the same with a compressed bit stream 3. The variable length encoding section 127 sands the compressed bit stream 3 to an outputting section 128.

The outputting section 128 transmits the compressed bit stream 3 constituting one or a plurality of frame images sent from the variable length encoding section 127, to a network 1.

The dequantizing section 129 dequantizes the "quantized orthogonal transformation coefficients" sent by the quantizing section 126, and sends the obtained "orthogonal transformation coefficients" to an inverse orthogonal transforming section 130.

The inverse orthogonal transforming section 130 performs inverse orthogonal transformation (for example, inverse DCT) for the "orthogonal transformation coefficients" sent by the dequantizing section 129, and sends the "predictive residual signal" obtained by the inverse orthogonal transformation, to the adding section 131.

The adding section 131 sends the result of adding up the "predicted image block" sent by the motion compensating section 123 and the "predictive residual signal" sent by the inverse orthogonal transforming section 130, to the frame memory 132.

When the "INTRA mode" is selected as the "macro block mode", the adding section 131 sends the "predictive residual signal sent by the inverse orthogonal transforming section 130 (the current macro block sent by the inputting section 121)" to the frame memory 132, because the "predicted image block" is not generated by the motion compensating section 123 (motion compensated inter-frame prediction is not performed).

The frame memory 132 constructs and stores the "reference frame" based on the information sent by the adding section 131 (the current macro block). The frame memory 132 sends the "reference frame" to the motion estimating section 122 and the motion compensating section 123.

The decoder 140 shown in FIG. 2 reproduces an output video signal 4 from the compressed bit stream 3 sent by the encoder 120.

An inputting section 141 receives the compressed bit stream 3, and sends the same to a variable length decoding section 142.

The variable length decoding section 142 decodes the "quantized orthogonal transformation coefficients", the "motion vector", and the "macro block mode" for each macro block starting from the head of each frame image in the compressed bit stream 3 sent by the inputting section 141.

The variable length decoding section 142 sends the decoded "quantized orthogonal transformation coefficients" to a dequantizing section 143. When the "macro block mode" is the "INTER mode" or "INTER 4V mode", the variable length decoding section 142 sends the one or several decoded "motion vectors" and "macro block mode" to a motion compensating section 145.

The dequantizing section 143 dequantizes the "quantized orthogonal transformation coefficients" sent by the variable length decoding section 142, so as to obtain the "orthogonal transformation coefficients" and to send the obtained "orthogonal transformation coefficients" to an inverse orthogonal transforming section 144.

The inverse orthogonal transforming section 144 performs inverse orthogonal transformation for the "orthogonal transformation coefficients" sent by the dequantizing section 143, so as to obtain the "predictive residual signal" and to send the obtained "predictive residual signal" to the adding section 146.

The motion compensating section 145 generates the "predicted image block" based on the reference frame stored in a frame memory 147 and the "motion vector" and "macro block mode" sent by the variable length decoding section 142, and sends the generated "predicted image block" to an adding section 146.

The adding section 146 adds up the "predictive residual signal" sent by the inverse orthogonal transforming section 144 and the "predicted image block" sent by the motion compensating section 145, so as to generate a macro block constituting the output video signal 4 and to send the generated macro block to an outputting section 148.

However, when the "macro block mode" is the "INTRA mode", the adding section 146 sends the "predictive residual signal" sent by the inverse orthogonal transforming section 144 to the outputting section 148 as the macro block constituting the output video signal 4, because the "predicted image block" is not sent by the motion compensating section 145.

The frame memory 147 constructs and stores the "reference frame" based on the information sent by the adding section 146 (the macro block). The frame memory 147 sends the "reference frame" to the motion compensating section 145.

The outputting section 148 constructs the output video signal 4 based on the information sent by the adding section 146 (the macro block), and outputs the output video signal 4 to a display device (not shown) at a predetermined timing of display.

As described above, in the conventional video coding transmission system, the "macro block mode" is determined for each macro block and the "coding information (motion vector, quantization parameter, eta.) set for each macro block is shared for coding process, thus increasing the coding efficiency.

However, the conventional video coding transmission system cannot set a plurality of the "macro block mode" in one macro block. Accordingly, there was a problem in that efficient coding cannot be performed when one macro block includes a portion (bird portion) which should be subjected to coding with the "intra-frame prediction mode" and a portion (cloud portion) which should be subjected to coding in the "inter-frame prediction mode", as shown in FIG. 4.

In order to solve this problem, there is a method in which the macro blocks are made smaller and the unit for switching the selection between the "macro block modes" is reduced. However, this method increases the number of macro blocks and then increases the number of transmissions of the coding information of each macro block necessary for coding, which causes a problem that reduces the coding efficiency.

Therefore, the present invention was made in the light of the aforementioned problems, and an object thereof is to switch the "macro block modes", so as to allow the portion which is subjected to coding with the "intra-frame prediction mode" and the portion which is subjected to coding with the "inter-frame prediction mode" to be mixed in one macro block without changing the size and framework of macro blocks.

DISCLOSURE OF THE INVENTION

A first feature of the present invention is summarized as an encoder for encoding each of first image blocks of a video. The encoder includes prediction mode selection information generating means, predictive residual signal generating means, and transmitting means. The prediction mode selection information generating means generates prediction mode selection information which indicates that a first prediction mode for reducing temporal redundancy is applied to each of second image blocks or that a second prediction mode for reducing spatial redundancy is applied to each of the second image blocks. The second image blocks are obtained by dividing the first image block. The predictive residual signal generating means generates a predictive residual signal by applying the selected first or second prediction mode to each of the second image blocks. The transmitting means encodes and transmits the prediction mode selection information and the predictive residual signal.

In the first feature of the present invention, it is preferable that the transmitting means encodes and transmits prediction mode related information necessary for a coding process in the first or second prediction mode.

In addition, in the first feature of the present invention, it is preferable that the predictive residual signal generating means generates the predictive residual signal from each of the second image blocks by motion compensated Inter-frame prediction using a motion vector, when the first prediction mode is selected to be applied, and the predictive residual signal generating means generates the predictive residual signal from each of the second image blocks by intra-frame prediction when the second prediction mode is selected to be applied.

Moreover, in the first feature of the present invention, it is preferable that the transmitting means encodes and transmits information indicating the motion vector as the prediction mode related information, when the first prediction mode is selected to be applied.

Further, in the first feature of the present invention, it is preferable that the predictive residual signal generating means generates the predictive residual signal by motion compensated inter-frame prediction using a same motion vector within the first image block.

Still further, the first feature of the present invention, it is preferable that the transmitting means transmits the prediction mode selection information before the prediction mode related information.

Furthermore, in the first feature of the present invention, it is preferable that the predictive residual signal generating means generates the predictive residual signal from each of the second image blocks by a pixel value prediction method using a value of a pixel adjacent to each of the second image blocks, when the second prediction mode is selected to be applied, and the transmitting means encodes and transmits the pixel value prediction method an the prediction mode related information.

Moreover, in the first feature of the present invention, it is preferable that the transmitting means encodes and transmits the prediction mode related information in association with the prediction mode selection information.

Further, in the first feature of the present invention, it is preferable that the transmitting means does not transmit the prediction, mode related information of the first prediction mode, when the first prediction mode is not applied to each of the second image blocks A second feature of the present invention is summarized as a decoder for decoding a video. The decoder includes prediction mode selection information decoding means and video decoding means. The prediction mode selection information decoding means decodes prediction mode selection information which indicates that a first prediction mode for reducing temporal redundancy is applied to each of second image blocks or that a second prediction mode for reducing spatial redundancy is applied to each of the second image blocks. The second image blocks are obtained by dividing a first image block. The first blocks are obtained by dividing the video. The video decoding means decodes each of the second image blocks of the video based on the first or second prediction mode selected by the prediction mode selection information.

In the second feature of the present invention, it is preferable that the decoder further includes prediction mode related information decoding means for decoding prediction mode related information necessary for a coding process in the first or second prediction mode, and the video decoding means decodes the video using the prediction mode related information.

In addition, in the second feature of the present invention, it is preferable that the video decoding means decodes each of the second image blocks of the video from the predictive residual signal by motion compensated inter-frame prediction, when the first prediction mode is selected to be applied by the prediction mode selection information, and the video decoding means decodes each of the second image blocks of the video from the predictive residual signal by intra-frame prediction, when the second prediction mode is selected to be applied by the prediction mode selection information.

Further, in the second feature of the present invention, it is preferable that the prediction mode related information decoding means decodes information indicating a motion vector as the prediction mode related information, when the first prediction mode is selected to be applied by the prediction mode selection information.

Still further, in the second feature of the present invention, it is preferable that the prediction mode selection information decoding means decodes the prediction mode selection information before the prediction mode related information.

Furthermore, in the second feature of the present invention, it is preferable that the video decoding means decodes the video using motion compensated inter-frame prediction by a same motion vector within the first image block, when the first prediction mode is selected to be applied by the prediction mode selection information.

Moreover, in the second feature of the present invention, it is preferable that the prediction mode related information decoding means decodes a pixel value prediction method related to the second image block as the prediction mode related information, when the second prediction mode is selected to be applied by the prediction mode selection information, and the video decoding means decodes the video using the pixel value prediction method.

Further, in the second feature of the present invention, it is preferable that the prediction mode selection information decoding means decodes the prediction mode selection information of each of the second image blocks.

Still further, in the second feature of the present invention, it is preferable that the prediction mode selection information is encoded in association with the prediction mode related information.

Furthermore, in the second feature of the present invention, it is preferable that the prediction mode related information decoding means does not decode the prediction mode related information of the first prediction mode, when the prediction mode selection information indicates that the first prediction mode is not applied to each of the second image blocks.

A third feature of the present invention is summarized as an encoding method of encoding each of first image blocks of a video. The encoding method includes a step A of generating prediction mode selection information which indicates that a first prediction mode for reducing temporal redundancy is applied to each of second image blocks or that a second prediction mode for reducing spatial prediction mode is applied to each of the second image blocks. The second image blocks are obtained by dividing a first image block, and the first image blocks are obtained by dividing the video. The encoding method includes a step B of generating a predictive residual signal by applying the selected first or second prediction mode to each of the second image blocks. The encoding method includes a step C of encoding and transmitting the prediction mode selection information and the predictive residual signal.

In the third feature of the present invention, it is preferable that prediction mode related information necessary for a coding process in the first or second prediction mode is encoded and transmitted, in the step C.

In addition, in the third feature of the present invention, it is preferable that the predictive residual signal is generated from the each of the Second image blocks by motion compensated inter-frame prediction using a motion vector when the first prediction mode is selected to be applied in the step B, and the predictive residual signal is generated from the each of the second image blocks by intra-frame prediction when the second prediction mode is selected to be applied in the step B.

Further, in the third feature of the present invention, it in preferable that information indicating the motion vector is encoded and transmitted as the prediction mode related information when the first prediction mode is selected to be applied, in the step C.

Still further, in the third feature of the present invention, it is preferable that the predictive residual signal is generated by motion compensated inter-frame prediction using a same motion vector within the first image blocks in the step B.

Furthermore, in the third feature of the present invention, it is preferable that the prediction mode selection information is transmitted before the prediction mode related information, in the step C.

Moreover, in the third feature of the present invention, it is preferable that the predictive residual signal is generated from each of the second image blocks by a pixel value prediction method using a value of a pixel adjacent to each of the second image blocks when the second prediction mode is selected to be applied in the step B, and the pixel value prediction method is encoded and transmitted an the prediction mode related information in the step C.

Further, in the third feature of the present invention, it is preferable that the prediction mode related information is encoded and transmitted in association with the prediction mode selection information, in the step C.

Furthermore, in the third feature of the present invention, it is preferable that the prediction mode related information of the first prediction mode is not transmitted, when the first prediction mode is not applied to each of the second image blocks, in the step C.

A fourth feature of the present invention is summarized as a decoding method for decoding a video. The decoding method includes a step A of decoding prediction mode selection information which indicates that a first prediction mode for reducing temporal redundancy is applied to each of second image blocks or that a second prediction mode for reducing spatial prediction mode is applied to each of the second image blocks. The second image blocks are obtained by dividing a first image block, and the first image blocks are obtained by dividing the video. The decoding method includes a step B of decoding each of the second image blocks of the video, based on the first or second prediction mode selected by the prediction mode selection information.

In the fourth feature of the present invention it is preferable that prediction mode related information necessary for a coding process in the first or second prediction mode is decoded in the step A, and the video is decoded using the prediction mode related information, in the stop B.

Further, in the fourth feature of the present invention, it is preferable that the video is decoded using motion compensated inter-frame prediction in the step B, when the first prediction mode is selected to be applied by the prediction mode selection information in the step A, and the video is decoded using intra-frame prediction in the step B, when the second prediction mode is selected to be applied by the prediction mode selection information in the step A.

Still further, in the fourth feature of the present inventions it is preferable that information indicating A motion vector is decoded as the prediction mode related information, when the first prediction mode is selected to be applied by the prediction mode selection information, in the step A.

Furthermore, in the fourth feature of the present invention it is preferable that the prediction mode selection information is decoded before the prediction mode related information, in the Step A.

Moreover, in the fourth feature of the present invention, it is preferable that the video is decoded using motion compensated inter-frame prediction by a same motion vector within the first image block, when the first prediction mode is selected to be applied by the prediction mode selection information, in the step B.

Further, in the fourth feature of the present invention, it is preferable that a pixel value prediction method related to the second image block to decoded as the prediction mode related information when the second prediction mode is selected to be applied by the prediction mode selection information in the step A, and the video is decoded using the pixel value prediction method in the step B.

Still further, in the fourth feature of the present invention, it is preferable that the prediction mode selection information of each of the second image blocks is decoded, in the step A.

Furthermore, in the fourth feature of the present invention, it is preferable that the prediction mode selection information is encoded in association with the prediction mode related information.

Moreover, in the fourth feature of the present invention, it is preferable that the prediction mode related information of the first prediction mode is not decoded, when the prediction mode selection information indicates that the first prediction mode is not applied to each of the second image blocks, in the step A.

A fifth feature of the present invention is summarized as a program causing a computer to function as an encoder which encodes each first image block of a video. The program includes prediction mode selection information generating means, predictive residual signal generating means, and transmitting means. The prediction mode selection information generating means generates prediction mode selection information which indicates that a first prediction mode for reducing temporal redundancy is applied to each of second image blocks or that a second prediction mode for reducing spatial redundancy is applied to each of the second image blocks. The second image blocks are obtained by dividing the first image block. The predictive residual signal generating means generates a predictive residual signal by applying the selected first or second prediction mode to each of the second image blocks. The transmitting means encodes and transmits the prediction mode selection information and the predictive residual signal.

A sixth feature of the present invention is summarized as a program causing a computer to function as a decoder which decodes a video. The program includes prediction mode selection information decoding means and video decoding means. The prediction mode selection information decoding means decodes prediction mode selection information which indicates that a first prediction mode for reducing temporal redundancy is applied to each of second image blocks or that a second prediction mode for reducing spatial redundancy is applied to each of the second image blocks. The second image blocks are obtained by dividing a first image block, and the first image blocks are obtained by dividing the video. The video decoding means decodes each of the second image blocks of the video, based on the first or second prediction mode selected by the prediction mode selection information.

A seventh feature of the present invention is summarised as a video coding transmission system having an encoder and a decoder. The encoder includes prediction mode selection information generating means, predictive residual signal generating means, and transmitting means. The prediction mode selection information generating means generates prediction mode selection information which indicates that a first prediction mode for reducing temporal redundancy is applied to each of second image blocks or that a second prediction mode for reducing spatial redundancy is applied to each of the second image blocks. The second image blocks are obtained by dividing a first image block, and the first image blocks are obtained by dividing the video. The predictive residual signal generating means generates a predictive residual signal by applying the selected first or second prediction mode to each of the second image blocks. The transmitting means encodes and transmits the prediction mode selection information and the predictive residual signal. The decoder includes prediction mode selection information decoding means and video decoding means. The prediction mode selection information decoding means decodes the prediction mode selection information of each of the second image blocks. The video decoding means decodes each of the second image blocks of the video based on the first or second prediction mode selected by the prediction mode selection information.

An eighth feature of the present invention is summarized to include a step of encoding and transmitting prediction mode selection information and a predictive residual signal in a coding process, a step of decoding the prediction mode selection information of each of the second image blocks in a decoding process, and a step of decoding each of the second image blocks of the video based on the first or second prediction mode selected by the prediction mode selection information. The prediction mode selection information indicates that a first prediction mode for reducing temporal redundancy is applied to each of second image blocks or that a second prediction mode for reducing spatial redundancy is applied to each of the second image blocks. The predictive residual signal are generated by applying the selected first or second prediction mode to each of the second image blocks. The second image blocks are obtained by dividing each of the first image blocks.

BRIEF DESCRIPTION OF THE DRAWINGS

FIGS. 8(*a*) and 8(*b*) are tables showing definitions of macro block modes and block layer syntax which are extended in the video coding transmission system according to the embodiment of the present invention.

FIG. 9 is a flowchart showing processing in a hybrid predicting section of the encoder used in the video coding transmission system according to the embodiment of the present invention.

FIG. 12 is a view showing motion estimation block Which are used in a motion estimating section of the encoder used in the video coding transmission system according to the embodiment of the present invention.

FIGS. 14(a) and 14(b) are tables showing definitions of macro block modes and block layer syntax which are extended in the video coding transmission system according to the embodiment of the present invention.

FIG. 17 is a table showing definitions of macro block syntax extended in the video coding transmission system according to an embodiment of the present invention.

BEST MODES FOR CARRYING OUT THE PRESENT INVENTION

Hereinafter, a description will be given of embodiments of the present invention with reference to the drawings.

Figure 5:
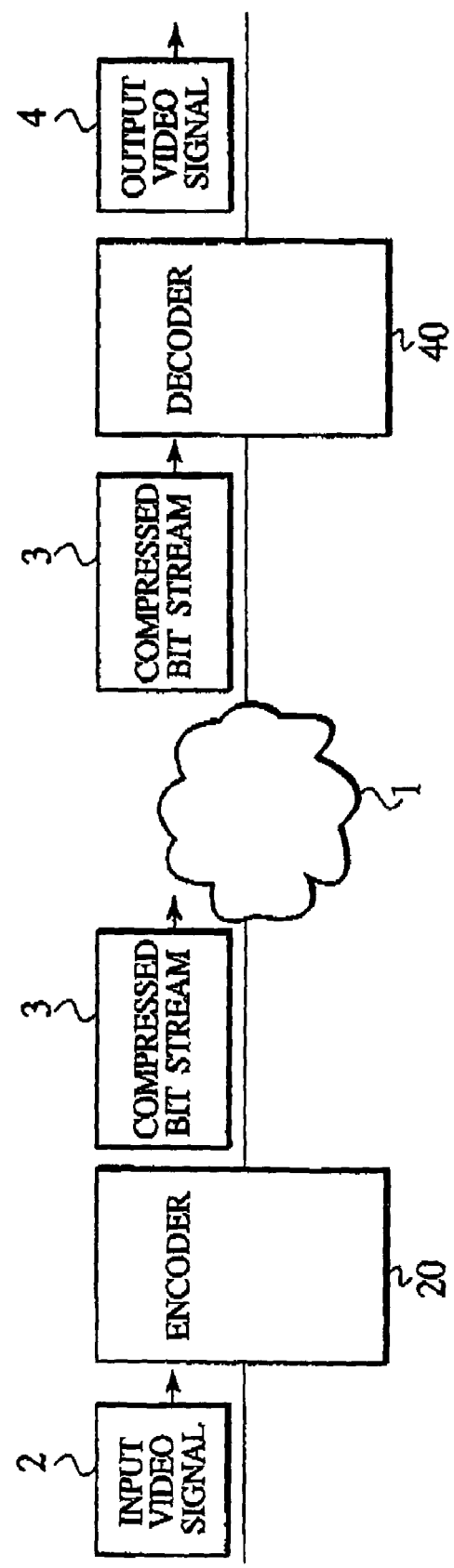
FIG. 5 is a schematic block diagram of a video coding transmission system according to an embodiment of the present invention.
Figure 6:
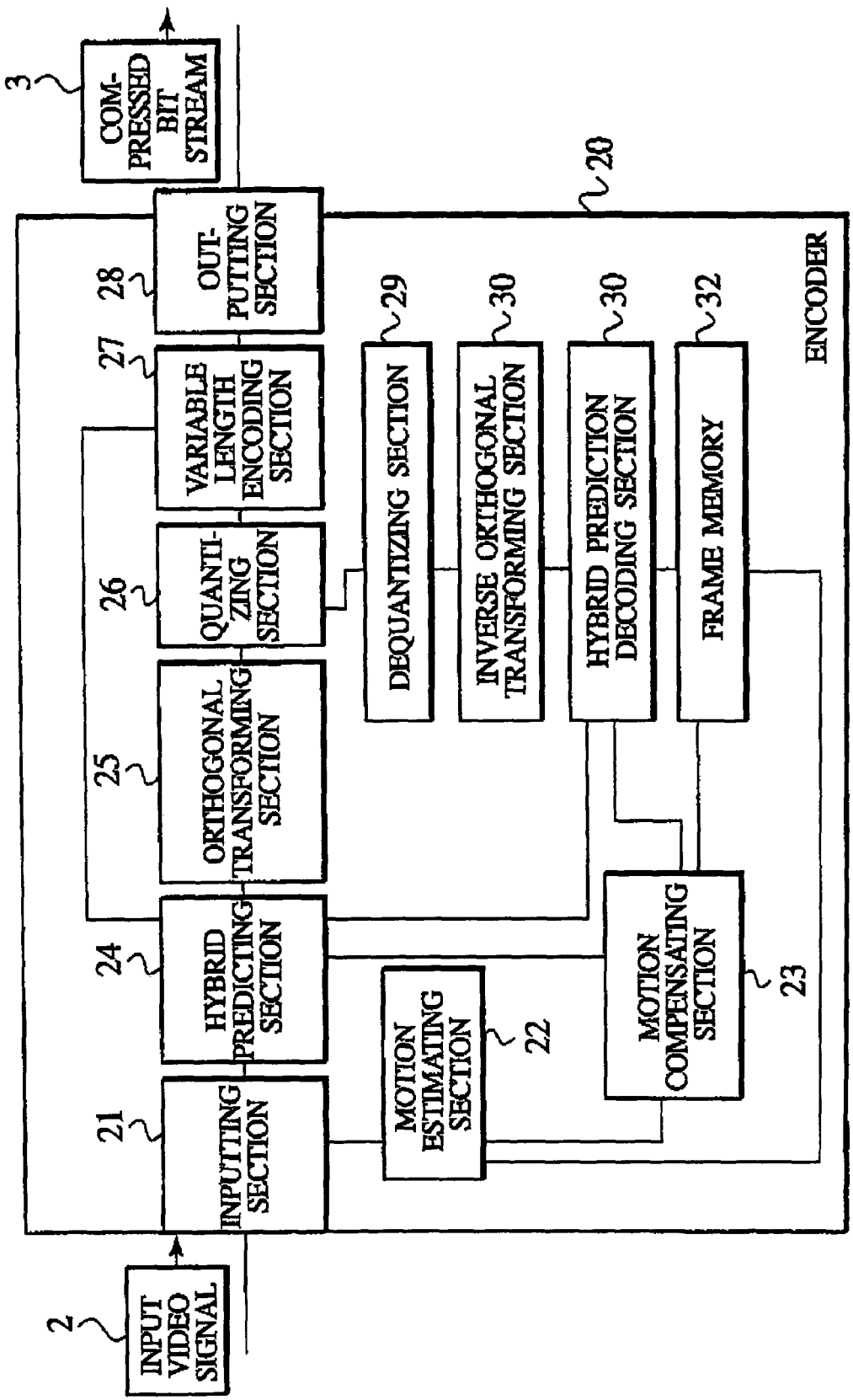
FIG. 6 is a block diagram showing the configuration of an encoder used in the video coding transmission system according to the embodiment of the present invention.

Configuration of Video Coding Transmission System According to Embodiment 1 of the Present Invention A description will be given of the configuration of a video coding transmission system according to Embodiment 1 of the present invention with reference to the drawings. FIG. 5 is a block diagram showing the configuration of the video coding transmission system according to this embodiment.

In the video coding transmission system according to this embodiment, an encoder 20 performs information compression and encoding process for an input video signal a which is a digital video, so as to obtain a "compressed bit stream 3", and transmits the compressed bit stream 3 to a decoder 40 via a network 1. In this video coding transmission system, the decoder 40 restores the compressed bit stream 3 so as to obtain an output video signal 4.

Herein, the network 1 is assumed to be various types of means which can receive and transmit the compressed bit stream 3, and is assumed to be, for example, a low-bit-rate digital communication line or the like. Note that the video coding transmission system according to this embodiment can be constructed using, for example, a system with a data storage device interposed instead of the communication line as the network 1.

As shown in FIG. 5, the video coding transmission system according to this embodiment includes the encoder 20 and the decoder 40. The video coding transmission system according to this embodiment is compliant with the aforementioned H.263 coding system and has a configuration to which modifications necessary for carrying out the present invention are applied on that basis.

Figure 1:
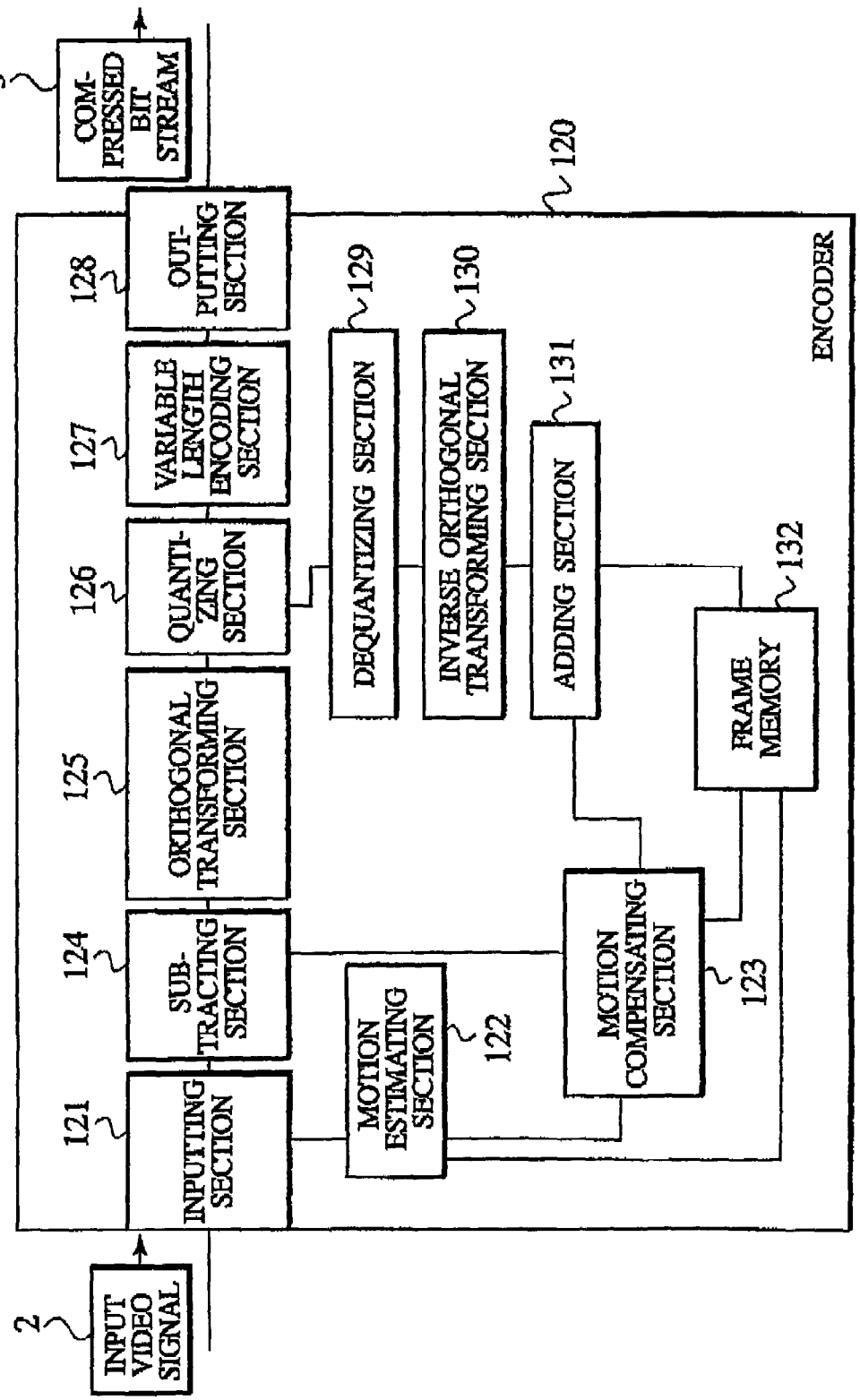
FIG. 1 is a block diagram showing the configuration of an encoder used in a video coding transmission system according to a prior art.
Figure 2:
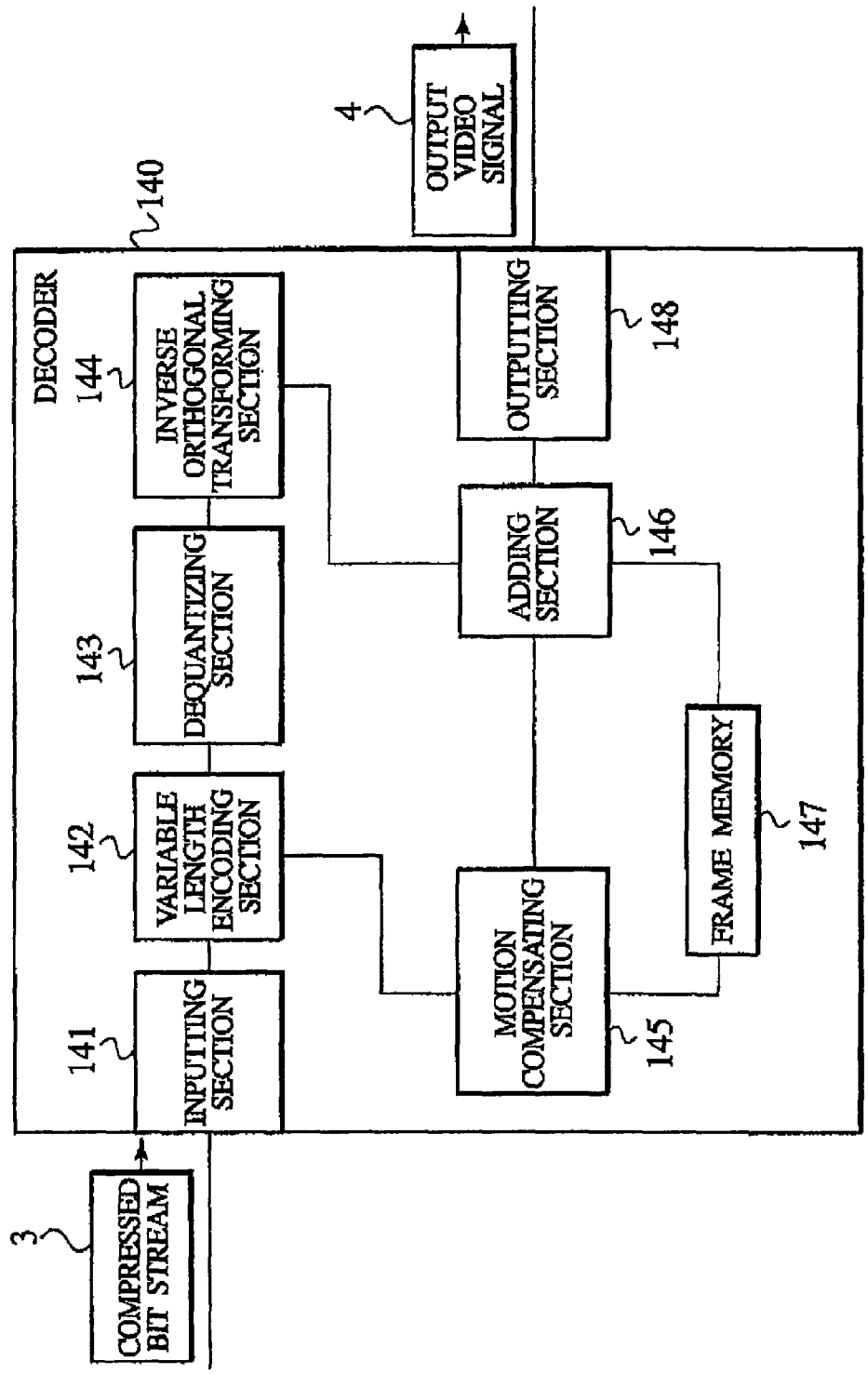
FIG. 2 is a block diagram showing the configuration of a decoder used in the video coding transmission system according to the prior art.
Figure 3:
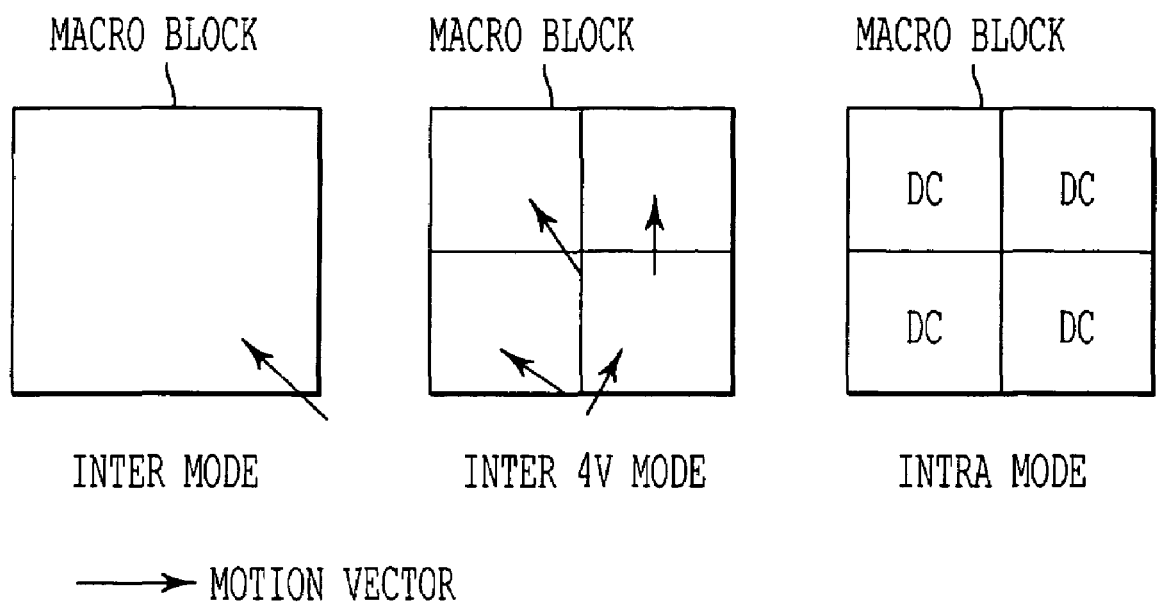
FIG. 3 is a view showing macro block codes.
Figure 4:
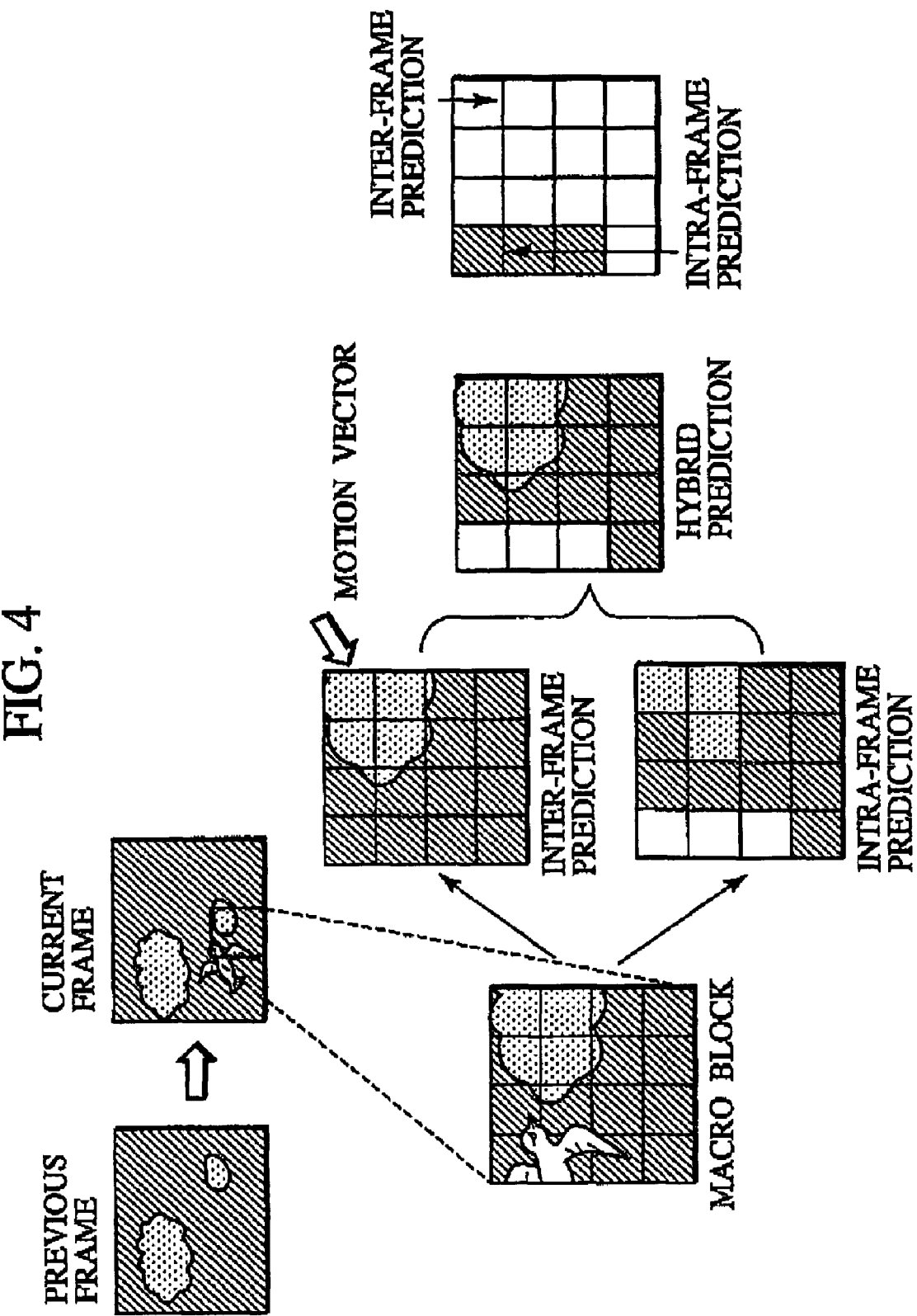
FIG. 4 is a view showing a case where a portion which is desirable to be encoded with an intra-frame prediction mode and a portion which is desirable to be encoded with an inter-frame prediction mode are mixed in a macro block.

The encoder 20 used in the video coding transmission system according to the embodiment is shown in FIG. 2. The encoder 20 according to this embodiment encodes each first image block (each macro block) of videos (input video signal 2).

Hereinafter, a description will be mainly given of differences between the encoder 20 according to this embodiment and the encoder 120 compliant with the conventional H.263 coding system. The encoder 20 according to this embodiment is assumed to be the same as the encoder 120 compliant with the H.263 coding system in the part not particularly described.

The configuration of the encoder 20 differs from that of the conventional encoder 120 in including a hybrid predicting section 24 and a hybrid prediction decoding section 31 instead of the conventional subtracting section 124 and the conventional adding section 131, respectively.

Moreover, in the encoder 20 according to this embodiment, the "macro block mode" is determined by a hybrid predicting section 24 instead of a motion estimating section 22.

The hybrid predicting section 24 divides each "macro block (first image block)" sent by the inputting section 21 into "sub-blocks (second image blocks)" of 8×8 pixels.

Moreover, the hybrid predicting section 24 calculates a "value indicating predictive residual signal power" for each "sub-block". For example, the hybrid predicting section 24 calculates a "SAD (Sums of Absolute Differences) between a sub-block within the macro block sent by the inputting section 21 and a sub-block within the predicted image block sent by the motion compensating section 23, as the "value indicating predictive residual signal power".

Furthermore, the hybrid predicting section 24 compares the calculated "SAD" with a predetermined threshold. When the "SAD" is smaller than the threshold, the hybrid predicting section 24 selects to apply an "inter-frame prediction mode (first prediction mode)" to the sub-block of interest. When the "SAD" is larger than the threshold, the hybrid predicting section 24 selects to apply au "intra-frame prediction mode (second prediction mode)" to the sub-block of interest.

In addition, after finishing the selection of the "prediction mode" for every sub-block within a macro block between application of the "inter-frame prediction mode (first prediction mode)" and application of the "intra-frame prediction mode (second prediction mode)", the hybrid predicting section 24 examines the selection states of the "prediction mode" in the entire macro block, so as to determine the "macro block mode" of the macro block of interest.

Herein, the "macro block mode" includes "INTRA mode", "INTER mode", "INTER 4V mode", and "INTRA/INTER mode". Note that the "Macro block mode" includes some other modes due to the differences in the presence of a change in quantization parameters and the like.

In this embodiment, a description will be given of only a case where the "macro block mode" is selected based on the difference in the selection state of the "prediction mode" of each sub-block, but the "macro block mode" can be also selected according to the presence of a change in quantization parameters and the like, Specifically, the hybrid predicting section 24 selects the "INTRA mode" as the "macro block mode", when the "intra-frame prediction mode" is selected for every sub-block within the macro block.

When the "inter-frame prediction mode" is selected for every sub-block within the macro block, the hybrid predicting section 24 selects the "INTER mode" or "INTER 4V mode" as the "macro block mode".

Moreover, when both the "intra-frame prediction mode" and the "inter-frame prediction mode" are selected together within the macro block the hybrid predicting section 24 selects the "INTRA/INTER mode" as the "macro block mode".

In addition, the hybrid predicting section 24 sends the "marco block mode" determined for each macro block, to a variable length encoding section 27 and the hybrid prediction decoding section 31.

Furthermore, when the "INTRA/INTER mode" is selected as the "macro block mode", the hybrid predicting section 24 sends the selection state of the "prediction mode" of each sub-block and the "motion vector" of each sub-block to which the "inter-frame prediction mode" is applied, to the variable length encoding section 27 and the hybrid prediction decoding section 31.

Herein, when the "INTRA/INTER mode" is selected, the hybrid predicting section 24 may send one motion vector for each macro block to the variable length encoding section 27 and the hybrid prediction decoding section 31, in order to suppress the increase in the amount of information necessary for coding the motion vectors.

Moreover, the hybrid predicting section 24 may directly send the motion vector for the "INTER mode" which is estimated by the motion estimating section 22, to the variable length encoding section 27 and the hybrid prediction decoding section 31. As a result, the hybrid predicting section 24 does not have to calculate the motion vector again, and the increase in the amount of processing can be suppressed in the hybrid predicting section 24.

Furthermore, the hybrid predicting section 24 may send a motion vector that most frequently appears among four motion vectors for the "INTER 4V mode" which are estimated by the motion estimating section 22, to the variable length encoding section 27 and the hybrid prediction decoding section 31, as the motion vector for the macro block. As a result, the variable length encoding section 27 can select a motion vector suitable for sub-blocks in which coding can be efficiently performed with the "inter-frame prediction mode" within the macro block, and increase the coding efficiency in the "INTRA/INTER mode".

In addition, the hybrid predicting section 24 may search for and obtain a new motion vector when the "INTRA/INTER mode" is selected.

In such a case, the hybrid predicting section 24 searches for a motion vector which minimizes the SAD in combination with the "intra-frame prediction mode", so as to achieve more efficient coding.

In other words, the hybrid predicting section 24 can implement the motion vector search using the robust estimation. In the robust estimation, the hybrid predicting section 24 repeats obtaining the SAD in each sub-block within the predicted image block in the macro block of the "INTER mode" and again searching for the motion vector after removing a sub-block with the largest SAD. Accordingly, it is possible to search for a motion vector closer to the optimum.

As described above, the hybrid predicting section 24 constitutes prediction mode selection information generating moans for generating "prediction mode selection states (prediction mode selection information)" indicating that the "inter-frame prediction mode (first prediction mode) for reducing temporal redundancy is applied to each of sub-blocks (second image blocks) or that the "intra-frame prediction mode (second prediction mode) for reducing spatial redundancy is applied to each of the sub-blocks (second image blocks). Herein, the sub-blocks are obtained by dividing a macro block (first image block).

Moreover, the hybrid predicting section 24 constitutes. predictive residual signal generating means for generating the predictive residual signal by applying the selected "inter-frame prediction mode (first prediction mode)" or the selected "intra-frame prediction mode (second prediction mode)" to the sub-blocks (second image blocks).

The variable length encoding section 27 encodes the "quantized orthogonal transformation coefficient" sent by the quantizing section 26 as the variable length codes, and encodes predetermined information, for example, information indicating the aforementioned prediction mode selection states a motion vector, and the like, as the variable length codes based on the "macro block mode" sent by the hybrid predicting section 24. The variable length encoding section 27 sends the encoded result to the outputting section 28.

Herein, to express the "INTRA/INTER mode", the definitions of the macro block modes of P pictures in the H.263 coding system are modified as shown in FIG. 8(*a*). In FIG. 8(*a*) the macro block modes with "MB type=6, 7" are extended to express the "INTRA/INTER mode".

The variable length encoding section 27 can determine which piece of information ("COD", "MCBPC", "CBPY", "DQUANT", "MVD", or "MVD2-4") should be multiplexed with the bit stream 3 together with the "quantized orthogonal transformation coefficients", with reference to the definitions of the macro block modes.

In FIG. 8(*a*), the "COD" is a flag indicating whether or not a macro block of interest is "skip". The "skip" indicates that the macro block is reproduced by duplicating the image in the same spatial position within the reference frame stored in the frame memory 32 and no requirement of additional particular information. In the case of "MB type =Not coded", the COD is 1, and the variable length encoding section 27 does not multiplex information other than the "COD" for the macro block of interest.

The "MCBPC" is a syntax element to express additionally "coded block pattern information (CBP)" of a color-difference signal in the macro block of interest. The "coded block pattern information: CBP" means a flag indicating whether or not significant DCT coefficients to be transmitted are present in sub-blocks which are the units for DCT transformation.

The "CBPY" is a syntax element to express coded block pattern information of a luminance signal in the macro block mode of interest.

The "DQUANT" indicates a modified value of the quantization parameters (for example, a quantization step) of the macro block of interest.

The "MVD" is at least one motion vector. The "MVD2-4" indicates the second to fourth motion vectors transmitted in the case of "INTER 4V mode".

In the "INTRA/INTER mode", to switch the "intra-frame prediction mode" and the "inter-frame prediction mode" for each sub-block for encoding, the "COD" is set to 0, and the "MCBPC" and "CBPY" are determined according to the distribution of the DCT coefficients. Moreover, the syntax (MB type=6, 7) for transmitting the "MVD" is used for sub-blocks to which the "inter-frame prediction mode" is applied.

Moreover, the syntax of the "block layer" in the H.263 coding system is extended as shown in FIG. 8(*b*) to show the selection state of the "intra-frame prediction mode" or the "inter-frame prediction mode" in each sub-block.

In FIG. 8(*b*), the "BTYPE" is composed of 1 bit and exists only in the case of "MB type=6, 7". Herein, the "BTYPE=0" indicates that the sub-block is encoded with the intra-frame prediction mode, and the "BTYPE=1" indicates that the sub-block is encoded with the inter-frame prediction mode.

The "INTRADC" is present only in the case that the "MB type=6, 7 and the "BTYPE"=0.

As previously described, the variable length encoding section 27 and the outputting section 28 constitute transmitting means for encoding and transmitting the prediction mode selection state (prediction mode selection information) and the predictive residual signal of each sub-block (second image block).

The hybrid prediction decoding section 31 generates a "macro block" constituting the "reference frame" used in the subsequent coding based on the "macro block mode" sent by the hybrid predicting section 24, and sends the generated macro block to the frame memory 32.

Specifically, when the "INTRA mode" is selected as the "macro block mode", the hybrid prediction decoding section 31 sets the "predictive residual signal" sent by an inverse orthogonal transforming section 30 as a "macro block" constituting the "reference frame", since the macro block of interest is constructed by the "intra-frame prediction".

When the "INTER mode" or "INTER 4V mode" is selected as the "macro block mode", the hybrid prediction decoding section 31 sets result of adding up the "predictive residual signal" sent by the inverse orthogonal transforming section 30 and the "predicted image block" sent by the motion compensating section 23 as a "macro block" constituting the "reference frame", since the macro block of interest is constructed by the "inter-frame prediction".

When the "INTRA/INTER mode" is selected as the "macro block mode", the hybrid prediction decoding section 31 switches the prediction mode to be applied to each sub-block, between the "intra-frame prediction mode" and "inter-frame prediction mode".

When the "intra-frame prediction mode" is applied to the sub-block, the hybrid prediction decoding section 31 sets the "predictive residual signal (sub-block basis)" sent by the inverse orthogonal transforming section 30 as the "sub-block" constituting the "reference frame".

On the contrary, when the "inter-frame prediction mode" is applied to the sub-block, the hybrid prediction decoding section 31 sets the result of adding up the "predictive residual signal (sub-block basis)" sent by the inverse orthogonal transforming section 30 and the "predicted image block (sub-block basis)" sent by the motion compensating section 23 as the "sub-block" constituting the "reference frame".

Figure 7:
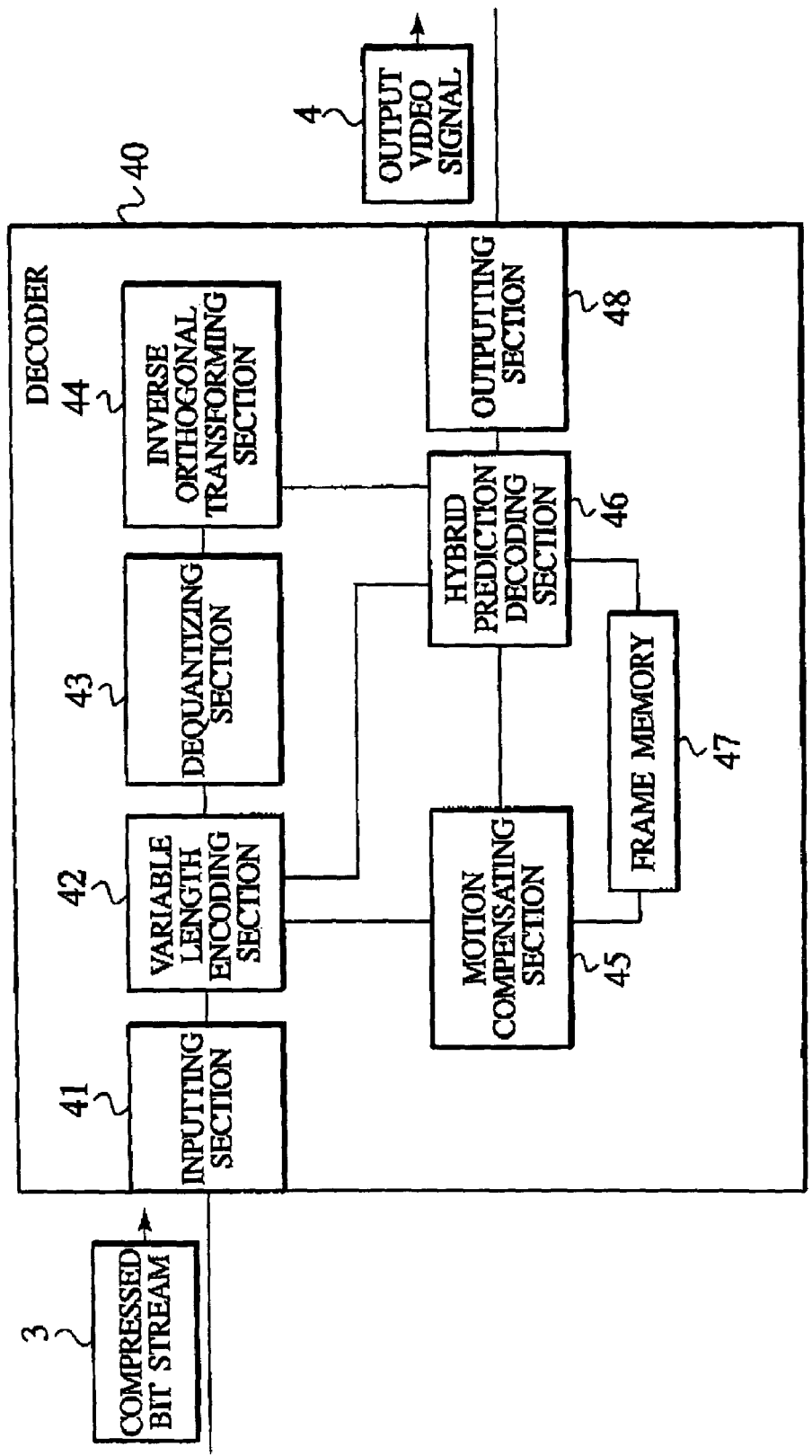
FIG. 7 is a block diagram showing the configuration of a decoder used in the video coding transmission system according to the embodiment of the present invention.

The decoder 40 according to this embodiment is shown in FIG. 7. Hereinafter, a description will be mainly given of a difference between the decoder 40 according to this embodiment and the conventional decoder 140 compliant with the H.263 coding system. The decoder 40 according to this embodiment is assumed to be the same as the decoder 140 compliant with the H.263 coding system in the part not particularly described.

The configuration of the decoder 40 is different from that of the conventional decoder 140 in including a hybrid prediction decoding section 46 instead of the conventional adding section 146.

A variable length decoding section 42 decodes necessary information ("quantized orthogonal transformation coefficients", "macro block modes", "motion vectors", and the like) for each macro block, starting from the head of each frame image in the compressed bit stream 3 sent by an inputting section 41.

The variable length decoding section 42 sends the decoded "quantized orthogonal transformation coefficients", "macro block modes", and "motion vector" to a dequantizing section 43, the hybrid prediction decoding section 46, and the motion compensating section 45, respectively.

Moreover, in the case where the "INTRA/INTER mode" is selected, the variable length decoding section 42 sends the "prediction mode selection states" and "motion vector" of each sub-block, to the hybrid prediction decoding section 46.

As described above, the variable length decoding section 42 constitutes prediction mode selection information decoding means or decoding "prediction mode selection states (prediction mode selection information)" which indicates that the "inter-frame prediction mode (first prediction mode) is applied to each of the sub-blocks (second image blocks) or that the "intra-frame prediction mode (second prediction mode)" is applied to each of the sub-blocks (second image blocks). The second image blocks are obtained by dividing a first image block, and the first blocks are obtained by dividing the video.

In the case where the "INTRA mode" is selected as the "Macro block mode", the hybrid prediction decoding section 46 sets the "predictive residual signal" sent by the inverse orthogonal transforming section 44 as a "macro block" constituting the output video signal 4, since the macro block of interest is constructed with intra-frame prediction.

Moreover, in the case where the "INTER mode" or "INTER 4V mode" is selected as the "macro block mode", the hybrid prediction decoding section 46 sets the result of adding up the "predictive residual signal" sent by the inverse orthogonal transforming section 44 and the "predicted image block" sent by the motion compensating section 23 as a "macro block" constituting the output video signal 4 since the macro block of interest is constructed with the motion compensated inter-frame prediction.

Furthermore, in the case where the "INTRA/INTER mode" is selected as the "macro block mode", the hybrid predicting section 46 switches the prediction mode to be used in each sub-block between the "intra-frame prediction mode" and the "inter-frame prediction mode", based on the "prediction mode selection states" sent by the variable length decoding section 42.

Herein, in the case where the "intra-frame prediction mode" is applied to the sub-block, the hybrid prediction decoding section 46 sets the "predictive residual signal (sub-block basis)" sent by the inverse orthogonal transforming section 44 as the "sub-block" constituting the output video signal 4.

On the contrary, in the case where the "inter-frame prediction mode" is applied to the sub-block, the hybrid prediction decoding section 46 sets the result of adding up the "predictive residual signal (sub-block basis)" sent by the inverse orthogonal transforming section 44 and the "predicted image block (sub-block basis)" sent by the motion compensating section 45 as the "sub-block" constituting the output video signal 4.

Furthermore, the, hybrid prediction decoding section 46 sends the "macro block" constituted of the sub-blocks obtained as described above to the outputting section 48, and sends the same "macro block" as a "macro block" constituting the "reference frame" used in the subsequent coding to the frame memory 47.

As described above, the hybrid prediction decoding section 46 constitutes video decoding means for decoding each of the second image blocks of the output video signal (video) 4, based on the "inter-frame prediction mode (first prediction mode)" or "intra-frame prediction mode (second prediction mode)" selected according to the prediction mode selection states (prediction mode selection information).

Operation of Video Coding System According to Embodiment 1

The operation of the video coding system having the aforementioned configuration will be described with reference to FIG. 9. FIG. 9 is a flowchart showing processing in the hybrid predicting section 24 of the encoder 20. Hereinafter, a description will be given of the operation of the video coding systems focusing on the operation of the hybrid predicting section 24 of the encoder 20.

As shown in FIG. 9, the hybrid predicting section 24 divides a macro block sent by the inputting section 21 into sub-blocks of 8×8 pixels in step 401.

In step 402, the hybrid predicting section 24 calculates the "SAD" for each sub-block between the sub-block within the macro block sent by the inputting section 21 and a sub-block within the predicted image block sent by the motion compensating section 23.

In step 403, the hybrid predicting section 24 compares the calculated SAD with a predetermined threshold.

When the SAD is larger than the threshold, the hybrid predicting section 24 selects to apply the "intra-frame prediction mode" to the sub-block of interest in step 404.

On the contrary, when the SAD is not larger than the threshold, the hybrid predicting section 24 selects to apply the "inter-frame prediction mode" to the sub-block of interest in step 405.

In step 406, the hybrid predicting section 24 judges whether or not the aforementioned selection of the prediction mode is performed for every sub-block within the macro block of interest. When the selection is not performed for every sub-block, the hybrid predicting section 24 returns to the step 402 and performs the aforementioned selection of the prediction mode for the rest of the sub-blocks.

When the aforementioned selection is performed for every sub-block, the hybrid predicting section 24 examines the prediction mode selection states in the entire macro block in step 407, and judges whether or not the "intra-frame prediction mode" is selected for every sub-block.

When the judgment is positive (YES), namely, when the "intra-frame prediction mode" is selected for every sub-block, the hybrid predicting section 24 vets the "macro block mode" of the macro block of interest to the "INTRA mode" in step 408.

On the contrary, when the judgment is negative (NO), namely, when the "intra-frame prediction mode" is not selected for every sub-block, in step 409, the hybrid predicting section 24 examines the prediction mode selection states of the entire macro block, and judges Whether or not the "inter-frame prediction mode" is selected for every sub-block.

When the judgment is positive (YES), namely, when the "inter-frame prediction mode" is selected for every sub-block, the hybrid predicting section 24 sets the "macro block mode" of the macro block of interest to the "INTER mode" or "INTER 4V mode" in step 410.

Herein, which is selected between the "INTER mode" and "INTER 4V mode" is determined based on the presence of difference in motion vectors within the macro block.

On the contrary, when the judgment is negative (NO), namely, when the "inter-frame prediction mode" is not selected for every sub-block, the hybrid predicting section 24 sets the "macro block mode" of the macro block of interest to the "INTRA/INTER mode" in step 411.

In step 412, the hybrid predicting section 24 sends the "macro block mode" determined for each macro block, to the variable length decoding section 27 and the hybrid prediction decoding section 31.

However, when the "INTRA/INTER mode" is set as the "macro block mode", the hybrid predicting section 24 sends the "macro block mode", the "prediction mode selection state" of each sub-block, and the "motion vector" of each sub-block (sub-block to which the inter-frame prediction mode to applied), to the variable length encoding section 27 and the prediction decoding section 31.

The description has been given of the video coding transmission system according to this embodiment assuming to have a configuration compliant with ITU-T H.263. However, the present invention is not limited to this and applicable to various video coding transmission systems which perform coding in units equivalent to the macro blocks (first image blocks) by using prediction modes of the "inter-frame prediction mode (first prediction mode)" and "intra-frame prediction mode (second prediction mode)".

Moreover, the "INTRA/INTER mode" is not limited to the configuration shown in this embodiment and can employ various syntaxes indicating which of the "inter-frame prediction mode" or the "intra-frame prediction mode" is applied to each sub-block (second image block) within the macro block (first image block).

Similarly, the "BTYPE" is not limited to the configuration shown in this embodiment and can employ various syntaxes indicating which of the "inter-frame prediction mode" or the "intra-frames prediction mode" is applied to each sub-block.

Furthermore, in this embodiment, the hybrid predicting section 24 compares the calculated SAD with a predetermined threshold and shall select the "macro block mode", but the selection criterion is not limited to the configuration shown in this embodiment.

It is possible to employ various selection criteria for selecting the "macro block mode" which enables more efficient coding. For example, the compressed bit stream 3 for the macro block of interest is actually constructed using each "macro block mode", and the "macro block mode" constructing the bit stream 3 having smaller amount of bits may be selected.

Function and Effect of Video Coding Transmission System According to Embodiment 1

With the video coding transmission system according to Embodiment 1, the hybrid predicting section 24 can optimally generate the predictive residual signal in which the spatial redundancy or the temporal redundancy is reduced from sub-blocks. Accordingly, a coding process can be efficiently performed even when the portion which is desirable to be encoded with the inter-frame prediction mode and the portion which is desirable to be encoded with the intra-frame prediction mode are mixed in a macro block.

Configuration of Video Coding Transmission System According to Embodiment 2

Figure 10:
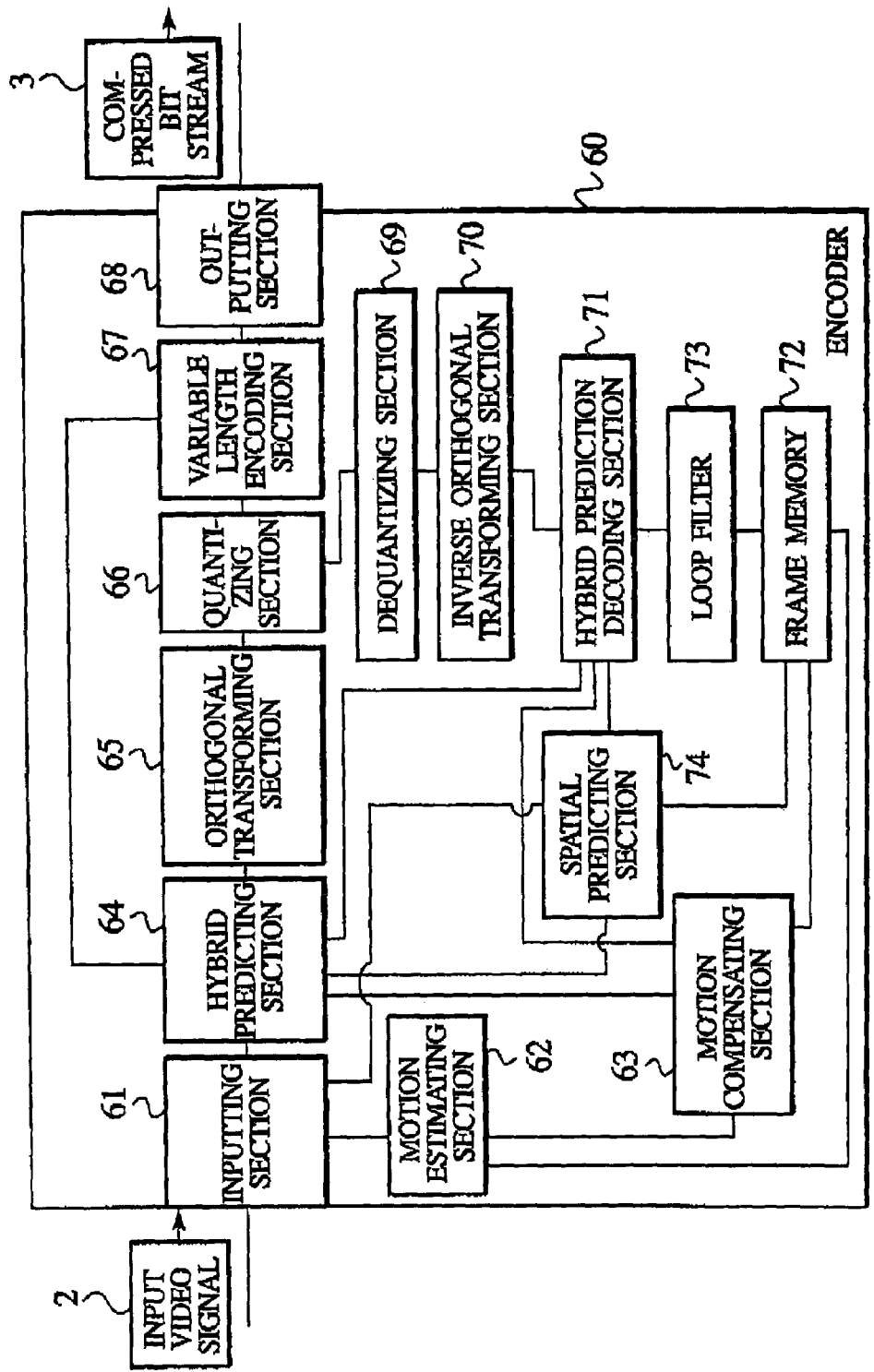
FIG. 10 is a block diagram showing the configuration of an encoder used in a video coding transmission system according to an embodiment of the present invention.
Figure 11:
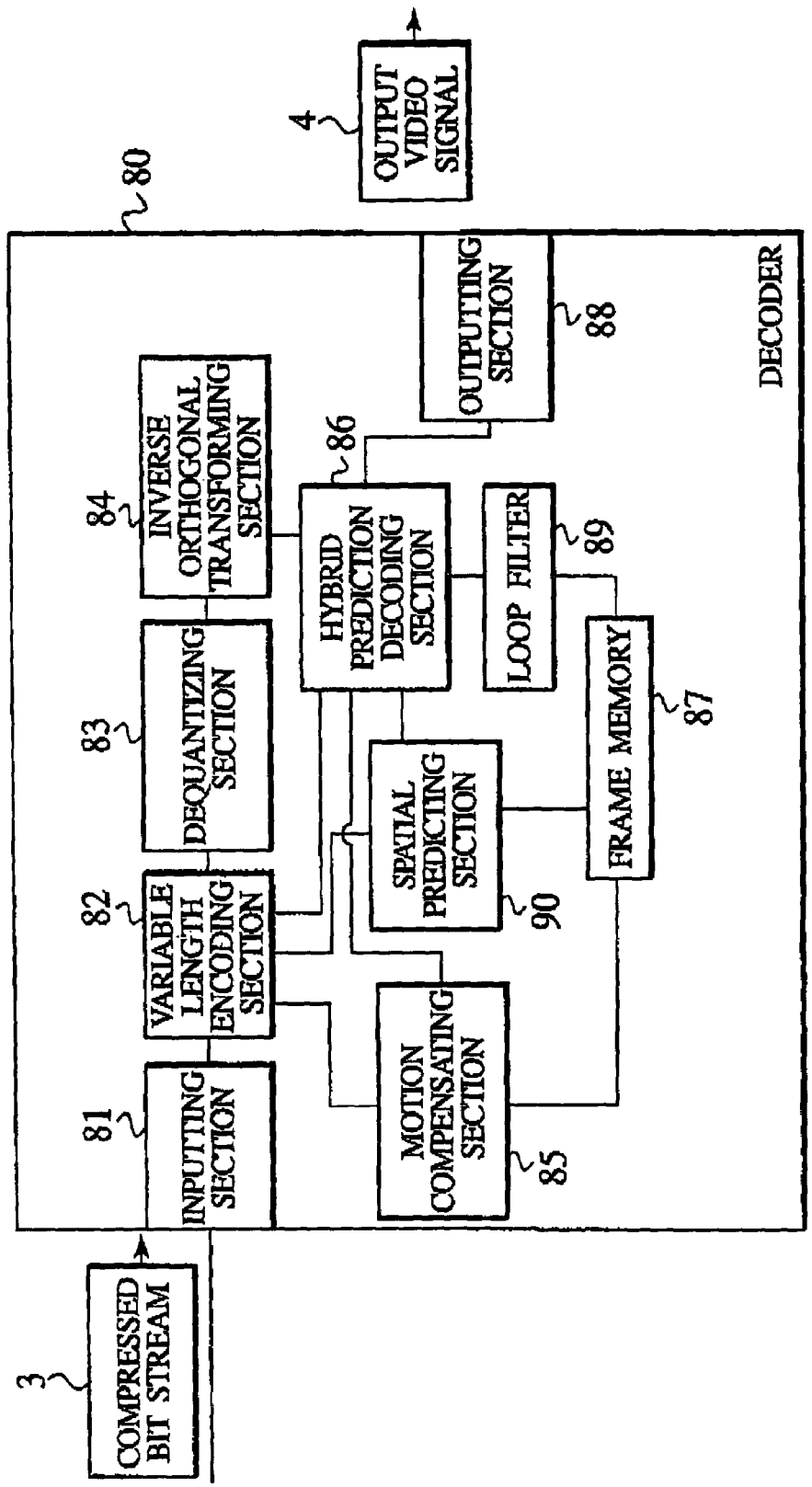
FIG. 11 is a block diagram showing the configuration of a decoder used in the video coding transmission system according to the embodiment of the present invention.

A description will be given of a video coding transmission system according to Embodiment 2 with reference to FIGS. 10 and 11. FIG. 10 is a block diagram showing an encoder 60 used in the video coding transmission system according to this embodiment. FIG. 11 is a block diagram showing a decoder 80 used in the video coding transmission system according to this embodiment.

The video coding transmission system according to this embodiment is compliant with the ITU-T H.26L coding system and has a configuration to which necessary modifications are added on that basis. The H.26L coding system is described in the ITU-T SG16 Q.6 VCEG-M81, "H.26 Test Model Long Term Number7 (TML-7) draft0," and the like.

Compared to the video coding transmission system according to the aforementioned Embodiment 1, the video coding transmission system according to this embodiment is modified in terms of miniaturization of the unit of "sub-blocks", a variety of motion vector estimation methods, and an adoption of a loop filter 73 and a spatial predicting section 74.

First, a description will be given of a difference related to the aforementioned miniaturization of the unit of "sub-blocks" in the encoder 60. In this embodiment, the unit of "sub-blocks" to be subjected to orthogonal transformation is "4×4 pixels" which is smaller than the unit of "8×8 pixels" in the case of the encoder 20 according to the aforementioned embodiment. Therefore, the minimum unit for prediction mode selection and the minimum unit for motion vector estimation is a sub-block of "4×4 pixels".

Second, a description will be given of a difference related to the aforementioned diversification of motion vector estimation methods in the encoder 60.

The motion estimating section 62 estimates "motion vectors" of each sub-block of 4×4 pixels as the minimum unit.

Specifically, the motion estimating section 62 estimates motion vectors related to all seven types of vector estimation units (16×16, 16×8, 8×16, 8×8, 4×8, 8×4, and 4×4) shown in FIG. 12 of each sub-block received through an inputting section 61 by using the reference frame stored in a frame memory 72.

Moreover, the motion estimating section 62 sends the estimated motion vectors and the motion estimation units used for estimating the respective motion vectors of interest, to a motion compensating section 63.

The motion compensating section 63 generates a "predicted image block" using each of the received motion vectors and a reference frame stored in the frame memory 72. The motion compensating section 63 sends the generated predicted image block and the motion estimation unit corresponding to the predicted image block of interest, to the hybrid predicting section 64.

Third, a description will be given of a difference related to the aforementioned adoption of the spatial predicting section 74 in the encoder 60.

Figure 13:
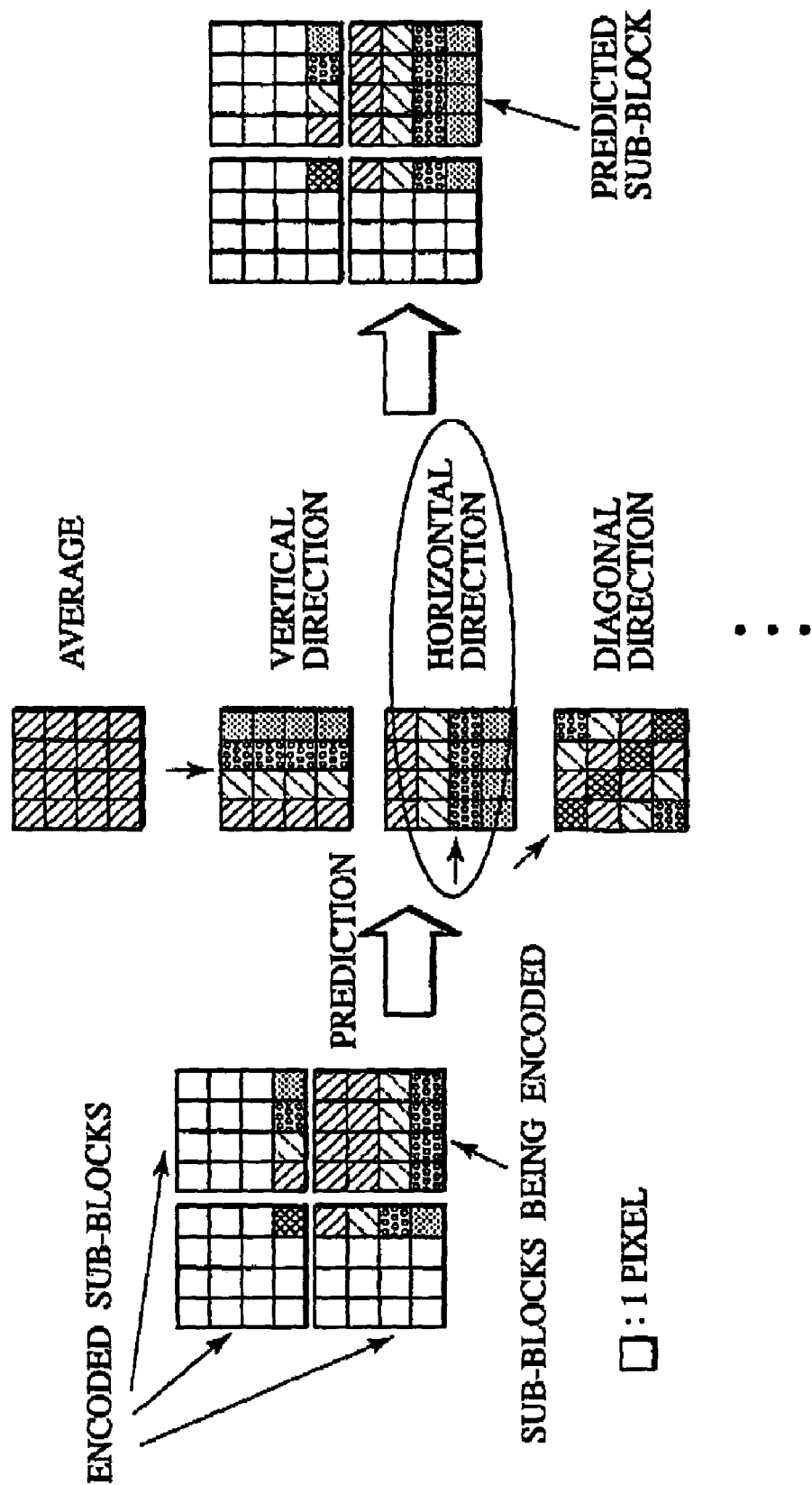
FIG. 13 is a view showing a principle of intra-frame pixel value prediction performed by a spatial predicting section of the encoder used in the video coding transmission system according to the embodiment of the present invention.

As shown in FIG. 13, the spatial predicting section 74 performs intra-frame pixel value prediction by several types of pixel value prediction methods which use pixel values of sub-blocks adjacent to the sub-block of interest, and generates the predicted image blocks, for each sub-block (4×4 pixels) within the macro block sent by the inputting section 61.

Herein, the spatial predicting section 74 requires sub-blocks which have been subjected to the series of processing including the orthogonal transformation, quantization, dequantization, and inverse orthogonal transformation, as the aforementioned adjacent sub-blocks, when performing the aforementioned intra-frame pixel value prediction. Therefore, in this embodiment, the series of processing including the orthogonal transformation, quantization, dequantization, and inverse orthogonal transformation is performed for each of sub-blocks (4×4 pixels).

Moreover, the spatial predicting section 74 performs the aforementioned intra-frame pixel value prediction by using sub-blocks (4×4 pixels) which have been subjected to the aforementioned series of processing.

The spatial predicting section 74 sends the generated predicted image block and the pixel value prediction method corresponding to the predicted image block of interest, to the hybrid predicting section 64 and the hybrid prediction decoding section 71.

The hybrid predicting section 64 selects a motion estimation unit corresponding to the "predicted image blocks (sub-block basis)" which results in the smallest SAD between the sub-block within the macro block sent by the inputting section 61 and "predicted image blocks (sub-block basis)" generated by the motion compensating section 63. Herein, the hybrid predicting section 64 applies the "inter-frame prediction mode" corresponding to the aforementioned motion estimation unit, to the sub-block of interest.

Moreover, The hybrid predicting section 64 selects a pixel value prediction method corresponding to the "predicted image blocks (sub-block basis)" which results in the smallest SAD between the sub-block within the macro block sent by the inputting section 61 and "predicted image blocks (sub-block basis)" generated by the spatial predicting section 74. The hybrid predicting section 64 applies the "intra-frame prediction mode" corresponding to the aforementioned pixel value prediction method, to the sub-block of interest.

Herein, the hybrid predicting section 64 compares the first SAD in the case of applying the "inter-frame prediction mode" with the second SAD in the case of applying the intra-frame pixel value prediction mode", and applies the prediction mode with the smaller SAD to the sub-block of interest.

The hybrid predicting section 64 applies the "prediction mode" as described above to every sub-block within the macro block, for example, sequentially from the upper left block to the lower right block.

Note that, the "macro block mode" in the case where the hybrid predicting section 64 applies the "inter-frame prediction mode" corresponding to the aforementioned motion estimation unit or the "intra-frame prediction mode" corresponding to the above pixel value prediction method to every sub-block within the macro block is the "INTRA/INTER mode".

Moreover, the hybrid predicting section 64 compares the SADs (SADs calculated using the macro block sent by the inputting section 61) in the cases where the "INTRA/INTER mode", "INTER mode", and "INTRA mode" are applied to the macro block, and sends the "macro block mode" with the smallest SAD to a variable length encoding section 67 as the "macro block mode" of the macro block of interest.

As a result, the hybrid predicting section 64 can apply the "inter-frame prediction mode" or "intra-frame prediction mode" to each sub-block, and search for a combination thereof achieving the most efficient coding.

When the "INTRA/INTER mode" is selected as the "macro block mode", the hybrid predicting section 64 sends the "macro block mode", the "prediction mode selection state" of each sub-block, and the "motion vector" or "pixel value prediction method" for each sub-block to the variable length encoding section 67 and the hybrid prediction decoding section 71.

When the "INTRA/INTER mode" is selected as the "macro block mode" and the "intra-frame pixel value prediction mode" is selected for the sub-block of interest, the hybrid prediction decoding section 74 adds up the predicted image block sent by the spatial predicting section 74 and the predictive residual signal sent by the inverse orthogonal transforming section 70, and sends the added result to the loop filter 73.

Moreover, when the "INTRA/INTER mode" is selected as the "macro block mode" and the "inter-frame prediction mode" is selected for the sub-block of interest, the hybrid prediction decoding section 71 adds up the predicted image block sent by the motion compensating section 63 and the predictive residual signal sent by the inverse orthogonal transforming section 70, and sends the added result to the frame memory 72 through the loop filter 73.

Fourth, a description will be given of a difference related to the aforementioned adoption of the loop filter 73 in the encoder 60.

The loop filter 73 serves to reduce deterioration such as distortion of sub-blocks, by performing filtering in sub-blocks for the result sent by the hybrid prediction decoding section 71.

In addition, in the video coding transmission system according to this embodiment, the definitions of the macro block modes for the P pictures in the H.26L coding system are modified as shown in FIG. 14(a) to indicate the "macro block mode" which is the "INTRA/INTER mode".

In FIG. 14(a), the "Intra_pred_mode" indicates the pixel value prediction method used for a sub-block to which the "intra-frame pixel value prediction mode" is applied.

The "Ref_frame" indicates the motion estimation unit used for a sub-block to which the "inter-frame prediction mode" is applied.

Moreover, the "Intra_pred_mode" is extended as shown in FIG. 14(b) to describe the "prediction mode selection state" of each sub-block. The portion of the "INTER_PRED: 6" is the extension.

In this embodiment, as shown in FIG. 14(a), the macro block mode corresponding to the "INTRA 4×4 mode" defined in the conventional H.26L coding system is changed to the "INTRA/INTER mode".

In the conventional H.26L coding system, when the "INTRA 4×4 mode" is selected as the macro block mode, the MB type is assigned to 7.

On the other hand, as shown in FIG. 14(b), the "INTRA/INTER mode" according to this embodiment is defined in such a manner that the "INTER_PRED" is added to the Intra_pred_mode" in the macro block mode with "MB type=7" assigned, so as to select not only the intra-frame pixel value prediction mode but also the inter-frame prediction mode for each sub-block of 4×4 pixels.

The definition of the "INTRA/INTER mode" is not limited to the above method and may be made separately from the "INTRA 4×4 mode". For example, the "INTRA/INTER mode" may be defined by assigning different macro block modes according to the prediction mode selection states of each of sub-blocks.

As a result, the "Intra_pred_mode" allows identifying the number of sub-blocks to which the intra-frame prediction mode is applied within the macro block and the number of sub-blocks to which the inter-frames prediction mode is applied within the macro block.

Moreover, the encoder 60 sends the "Intra_pred_mode" before the information concerning the inter-frame prediction mode such as the "MV" and the "Ref_frame", in a macro block to which the "INTRA/INTER mode" is applied. Accordingly, the encoder 60 can send the syntax elements for the "INTRA/INTER mode" without waste in the case where such information concerning the inter-frame prediction is not required.

Furthermore, when the "INTRA/INTER mode" is selected, the hybrid predicting section 64 may send a motion vector per one macro block to the variable length encoding section 67 and the hybrid prediction decoding section 71, in order to suppress the increase in the amount of information necessary for coding motion vectors.

The hybrid predicting section 64 may obtain a prediction value from a motion vector of a macro block (INTER mode) already coded among macro blocks adjacent to the current macro block, and set the difference between the prediction value of interest and the current macro block as a motion vector of the current macro block.

In addition, the hybrid predicting section 64 may directly send the motion vector for the "INTER 16×16 mode" which to previously estimated by the motion estimating section 62, to the variable length encoding section 67 and the hybrid prediction decoding section 71.

The hybrid predicting section 64 may send a motion vector that the most frequently appears among the motion vectors of each sub-block estimated by the motion estimating section 62, to the variable length encoding section 67 and the hybrid prediction decoding section 71, as a motion vector of the current macro block.

As a result, it is possible to select a motion vector suitable for sub-blocks which can be efficiently coded with the "inter-frame prediction mode" within the macro block, and increase the coding efficiency in the "INTRA/INTER mode".

The decoder 80 according to this embodiment is shown in FIG. 11. Hereinafter, a description will be mainly given of differences between the decoder 40 according to the aforementioned Embodiment 1 and the decoder 80 according to this embodiment. The decoder 80 according to this embodiment is the same as the decoder 40 according to the aforementioned Embodiment 1 in the part not particularly described.

The configuration of the decoder 80 according to this embodiment differs from that of the decoder 40 according to the aforementioned Embodiment 1 in including a loop filter 89 and a spatial predicting section 90.

The loop filter 89 includes the same function as the loop filter 73 of the encoder 60. The loop filter 89 serves to reduce deterioration such as distortion of sub-blocks, by performing filtering in sub-blocks to the result sent by a hybrid prediction decoding section 86.

The spatial predicting section 90 performs the intra-frame pixel value prediction by the pixel value prediction method sent by the variable length decoding section 82, for each sub-block (4×4 pixels) within an image of the reference frame stored in the frame memory 72, so as to generate a predicted image block.

Specifically, when the "INTER mode" is selected as the "macro block mode", the hybrid prediction decoding section 86 sets the result of adding up the "predictive residual signal" sent by the inverse orthogonal transforming section 84 and the "predicted image block" sent by the motion compensating section 85 as a "macro block" constituting the output video signal 4, since the macro block of interest is constructed by the motion compensated inter-frame prediction.

Moreover, when the "INTRA mode" is selected as the "macro block", the hybrid prediction decoding section 86 sets the result of adding up the "predictive residual signal" sent by the inverse orthogonal transforming section 84 and the "predicted image block" sent by the spatial predicting section 90 as a macro block constituting the output video signal 4, since the macro block of interest is constructed by the intra-frame prediction.

Furthermore, when the "INTRA/INTER mode" is selected as the "macro block mode", the hybrid prediction decoding section 86 switches the prediction mode to be used for each sub-block of 4×4 pixels between the "intra-frame prediction mode" and the "inter-frame prediction mode".

In other words, when the "intra-frame pixel value prediction mode" is applied to the sub-block of interest, the hybrid prediction decoding section 86 sets the "predictive residual signal (sub-block basis)" sent by the inverse orthogonal transforming section 44 as the "sub-block" constituting the output video signal 4.

On the contrary, when the "intra-frame prediction mode" is applied to the sub-block of interest, the hybrid prediction decoding section 86 sets the result of adding up the "predictive residual signal (sub-block basis)" sent by the inverse orthogonal transforming section 44 and the "predicted image block" sent by the spatial predicting section 90 as the "sub-block" constituting the output video signal 4.

The hybrid prediction decoding section 86 generates a "macro block" constituting the output video signal 4 from these "sub-blocks".

The variable length decoding section 82 Constitutes prediction mode related information decoding means for decoding prediction mode related information (motion vectors or pixel value prediction methods) necessary for performing the first or second prediction mode.

Operation of Video Coding Transmission System According to Embodiment 2

Figure 15:
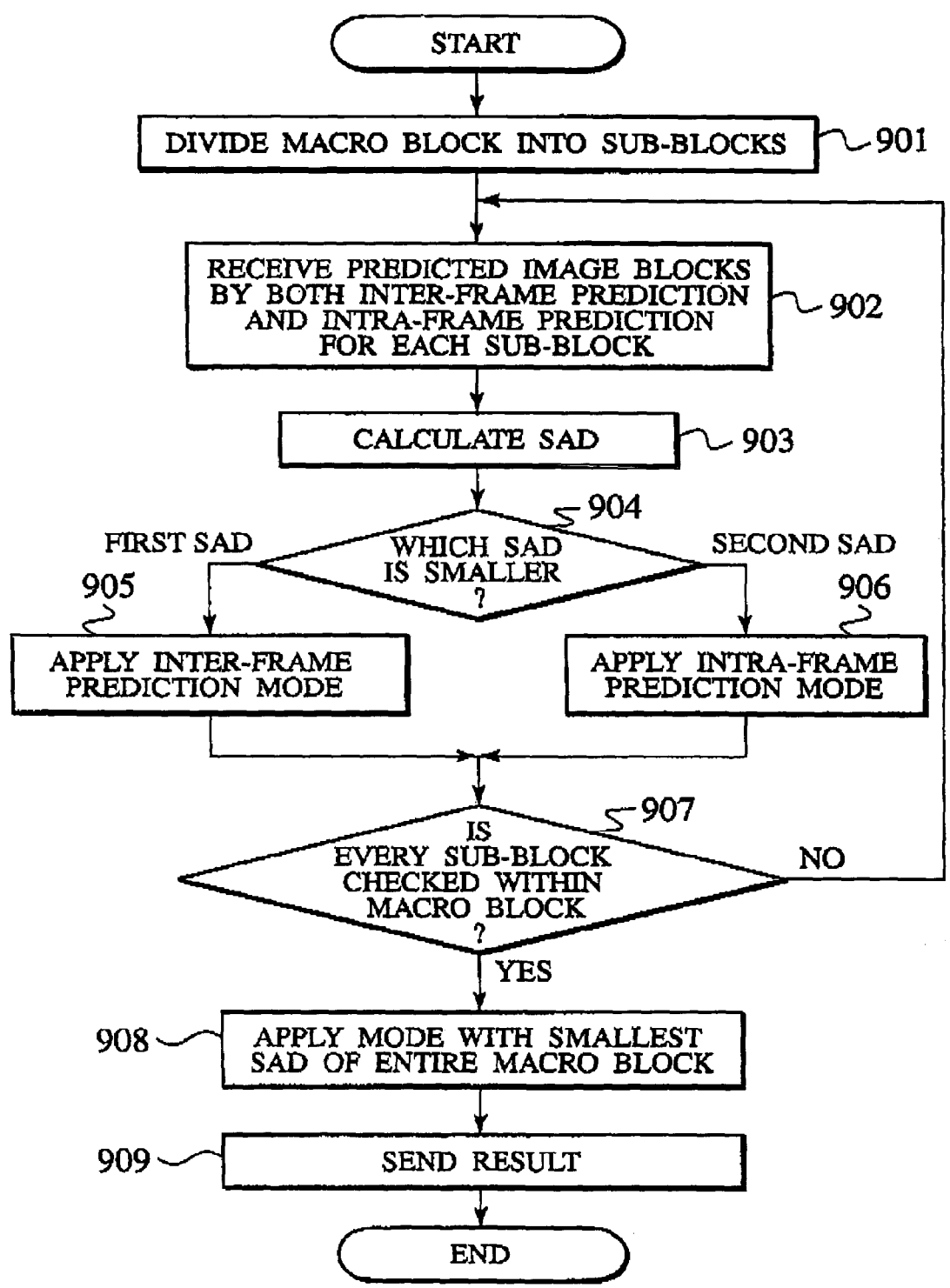
FIG. 15 is a flowchart showing processing in a hybrid predicting section of the encoder used in the video coding transmission system according to the embodiment of the present invention.

The operation of the video coding transmission system with the aforementioned configuration will be described with reference to FIG. 15. FIG. 15 is a flowchart showing processing in the hybrid predicting section 64 of the encoder 60. Hereinafter, a description will be given of the operation of the video coding transmission system, focusing on the operation of the hybrid predicting section 64 of the encoder 60.

As shown in FIG. 13, the hybrid predicting section 64 divides a macro block sent by the inputting section 61 into sub-blocks of 4×4 pixels in step 901.

In step 902, the hybrid predicting section 64 receives from the motion compensating section 63 a plurality of predicted image blocks (sub-block basis) which have been generated by the motion compensated inter-frame prediction using a plurality of motion estimation units. Moreover, the hybrid predicting section 64 receives from the spatial predicting section 74 a plurality of predicted image blocks (sub-block basis) which have been generated by the intra-frame pixel value prediction using a plurality of pixels value prediction methods.

In step 903, the hybrid predicting section 64 selects a predicted image block that results in the smallest first SAD between a sub-block within the macro block sent by the inputting section 61 and one out of the plurality of predicted image blocks (sub-block basis) from the motion compensating section 63.

Moreover, the hybrid predicting section 64 selects a predicted image block that results in the smallest second BAD between a sub-block within the macro block sent by the inputting section 61 and one out of the plurality of predicted image blocks (sub-block basis) from the spatial predicting section 74.

In step 904, the hybrid predicting section 64 compares the aforementioned first 8AD with the aforementioned second SAD for each sub-block. When the first SAD is smaller, the hybrid predicting section 64 sets the prediction mode of the sub-block of interest to the "inter-frame prediction mode" in step 905. When the second SAD is smaller, the hybrid predicting section 64 sets the prediction mode of the sub-block of interest to the "intra-frame pixel value prediction mode" in step 906.

In step 907, the hybrid predicting section 64 judges whether or not the above selection is performed for every sub-block within the macro block of interest. When the selection is not performed for every sub-block, the hybrid predicting section 64 returns to the step 902 and performs the above selection of the prediction mode for the rest of the sub-blocks.

When the aforementioned selection of the prediction mode is performed for every sub-block, in step 908, the hybrid predicting section 64 compares the SAD for the "INTRA/INTER mode" which is the sum of the SADs for the entire macro block of interest, the SAD of the predicted image block by the motion compensated inter-frame prediction which is sent by the motion compensating section 63, with the SAD of the predicted image block by the intra-frame image pixel value prediction which is sent by the spatial predicting section 74.

The hybrid predicting section 64 then applies the prediction mode with the smallest SAD as the "macro block mode" to the macro block of interest.

In step 909, the hybrid predicting section 64 sends this "macro block mode" to the variable length encoding section 67 and the hybrid prediction decoding section 71.

Herein, when the "INTRA/INTER mode" is selected as the "macro block mode", the hybrid predicting section 64 sends the "macro block mode", the "prediction mode selection states" of individual sub-blocks, and the "motion vectors" or the "pixel value prediction methods", to the variable length encoding section 67 and the hybrid prediction decoding section 71.

The video coding transmission system according to this embodiment has been described as a construction compliant with ITU-T H.263. The present invention is not limited to this and applicable to various types of video coding transmission systems which perform a coding process using prediction modes of the "inter-frame prediction mode (first prediction mode)" and "intra-frame prediction mode (second prediction mode)" in units equivalent to the macro blocks (first image blocks).

Moreover, the "INTRA/INTER mode" is not limited to the configuration shown in this embodiment and can employ various syntaxes indicating which of the "inter-frame prediction mode" or "intra-frame prediction mode" is applied to each sub-block (second image block) within the macro block (first image block).

For example, the "INTRA/INTER mode" may be used separately from the "INTRA 4×4 mode". In this case, when the prediction mode selection state of every sub-block within the macro block is the "intra-frame pixel value prediction mode", the "INTRA 4×4 mode" is applied to the macro block of interest. On the contrary, when the prediction mode selection states of the sub-blocks within the macro block include the "inter-frame prediction mode", the "INTRA/INTER mode" is applied to the macro block of interest.

At this time, in the "INTRA 4×4 mode", the "Intra_pred_mode" indicating the prediction mode selection states uses a table not extended, which is used in the conventional H.26L coding system. On the other hand, in the "INTRA/INTER mode", the "Intra_pred_mode" indicating the prediction mode selection states uses a table extended as shown in FIG. 14(b) or a table in which part of items concerning the "intra-frame prediction mode" other than the "INTER_PRED" is omitted. Accordingly, the syntax elements for the "INTRA 4×4 mode" and the "INTRA/INTER mode" can be sent efficiently.

Similarly, the "Intra_pred_mode" is not limited to the configuration shown in this embodiment and can employ various syntaxes indicating which of the "inter-frame prediction mode" or "intra-frame prediction mode" is applied to each sub-block.

Furthermore, in this embodiment, the hybrid predicting section 64 compares the calculated SAD with the predetermined threshold so as to select the "macro block mode". However, this selection criterion is not limited to this configuration shown in this embodiment.

It is possible to employ various selection criteria for selecting the "macro block mode" which enables more efficient coding. For example, the compressed bit stream 3 for the macro block of interest is actually constructed with each "macro block mode", and the "macro block mode" constructing the macro block having smaller amount of bits of the bit stream 3 may be selected.

Function and Effect of Video Coding Transmission System According to Embodiment 2

With the video coding transmission system according to Embodiment 2, the hybrid predicting section 64 can optimally generate a predictive residual signal in which the spatial redundancy or the temporal redundancy is reduced from sub-blocks. Accordingly, it is possible to perform efficient coding even when the portion which is desirable to be encoded with the inter-frame prediction mode and the portion which is desirable to be encoded with the intra-frame prediction mode are mixed in a macro block.

Configuration of Video Coding Transmission System According to Embodiment 3 to the Present Invention A description will be given of a video coding transmission system according to Embodiment 3 of the present invention with reference to the drawings. Similar to the case of the Embodiment 2 of the present invention, the video coding transmission system according to this embodiment is compliant with the ITU-T H.26L coding system and provided with a configuration to which modifications necessary for carrying out this present invention are added on that basis. The configuration of the video coding transmission system according to this embodiment is shown in FIGS. 10 and 11 as well as the case of the Embodiment 2.

Compared to the video coding transmission system according to the Embodiment 2, the video coding transmission system according to this embodiment is modified in the following points.

First, the video coding transmission system according to this embodiment is modified in terms of setting a "sub-block" that is a unit for selecting which of the "inter-frame prediction mode" and "intra-frame prediction mode" is to be applied as the "prediction mode" to the "motion estimation unit" shown in FIG. 12, instead of the "block unit of 4×4 pixels" that to a unit for orthogonal transformation.

Second, the video coding transmission system according to this embodiment is modified in terms of defining the syntax necessary for selecting application of the "inter-frame prediction mode" or application of "intra-frame prediction mode" on such sub-block basis.

Hereinafter, a description will be given of only differences between the encoder 60 according to the Embodiment 2 and the encoder 60 according to this embodiment. The encoder 60 according to this embodiment is assumed to be the same as the encoder 60 according to the aforementioned Embodiment 2 in the part not particularly described.

In the description of this embodiment, unlike in the case of the Embodiment 2, a block of 4×4 pixels that is the unit of orthogonal transformation is referred to as an "orthogonal transformation block", instead of the "sub-block", because of the aforementioned difference of the unit of "sub-blocks".

In the encoder 60 according to this embodiment, the motion estimating section 62 estimates "motion vectors" based on seven types of motion estimation units (16×16, 16×8, 8×16, 8×8, 4×8, 8×4, and 4×4) shown in FIG. 12, namely, on a "sub-block" basis, and sends the estimated "motion vectors" as "motion vectors" in respective "prediction mode (specifically, corresponding to the respective motion estimation units shown in FIG. 12)".

The motion compensating section 63 applies the "motion vectors" sent by the motion estimating section 62 to the reference frame stored in the frame memory 72 so as to generate "predicted image blocks (sub-block basis)". The motion compensating section 63 then sends the generated "predicted image block (sub-block basis)" to the hybrid predicting section 64.

As shown in FIG. 11, the spatial predicting section 74 performs several types of pixel value predicting methods which use pixel values of orthogonal, transformation blocks adjacent to the orthogonal transformation block of interest for each "orthogonal transformation block (4×4 pixels)" within the macro block sent by the inputting section 61, so as to generate predicted image blocks (sub-block basis). The spatial predicting section 74 sends the generated "predicted image blocks (sub-block basis)" to the hybrid predicting section 64.

The spatial predicting section 74 performs the aforementioned generation of predicted image blocks for every orthogonal transformation block included within one sub-block, and selects a pixel value prediction method which minimizes the SAD from the sub-block received via the inputting section 61.

Herein, the spatial predicting section 74 also performs the intra-frame pixel value prediction for the entire macro block (16×16) by several types of intra-frame pixel value prediction methods using pixel values of macro blocks adjacent to the macro block of interest, so as to generate a predicted image block.

The spatial predicting section 74 may send, to the hybrid predicting section 64, an identifier indicating the pixel value prediction method instead of the aforementioned predicted image blocks (sub-block basis) generated by using the selected pixel value prediction method.

The aforementioned orthogonal transformation blocks adjacent to the orthogonal transformation block of interest are required to have been subjected to the series of processing including the orthogonal transformation, quantization, dequantization, and inverse orthogonal transformation. Accordingly, the spatial predicting section 74 performs the aforementioned intra-frame pixel value prediction by using orthogonal transformation blocks which have been subjected to this series of processing.

In such a case, when am adjacent orthogonal transformation block is included in the same macro block, the prediction mode used for the adjacent orthogonal transformation block has not been fixed yet in some cases.

In this case, the aforementioned coding and decoding may be performed using a prediction mode which is the candidate for the adjacent orthogonal transformation block of interest. Alternatively, in the case where the adjacent orthogonal block is included in the same macro block, the intra-frame pixel value prediction may be performed on the assumption that the adjacent orthogonal transformation block of interest is outside the macro block.

The hybrid predicting section 64 divides the macro block sent by the inputting section 61 into "sub-blocks (motion estimation units)", and applies the "inter-frame prediction mode" or "intra-frame prediction mode" to each sub-block, so as to search for the combination that provides the most efficient coding.

Specifically, the hybrid predicting section 64 sequentially examines the "prediction modes" corresponding to the seven types of motion estimation units shown in FIG. 12 as follows.

The hybrid predicting section 64 calculates the SAD, between the "predicted image block" and the sub-block within the macro block sent by the inputting section 61, for each sub-block in each prediction mode. Herein, the "predicted image block" is the "predicted image block (sub-block basis)" by the motion compensated inter-frame prediction sent by the motion predicting section 63, or the "predicted image block (orthogonal transformation block basis)" by the intra-frame pixel value prediction sent by the spatial predicting section 74. The hybrid predicting section 64 then sets, prediction method (motion compensated inter-frame prediction or intra-frame pixel value prediction) with the smaller SAD as the prediction method for the sub-block of interest.

The "predictive residual signal (sub-block basis)" generated based on the predicted image sub-block by this prediction method is subjected to the series of coding and encoding processing including the orthogonal transformation, quantization, dequantization, and inverse orthogonal transformation. The aforementioned processing is performed for every sub-block (sequentially from the upper left sub-block to the lower right sub-block) within the macro block.

After performing the aforementioned processing for every sub-block within the macro block, the hybrid predicting section 64 holds the sum of the SADs for the entire macro block as the SAD in the "macro block mode (INTER 16×16 mode, etc.)" corresponding to each motion estimation unit. The hybrid predicting section 64 then performs the aforementioned processing in the same manner for a "macro block mode (INTER 16×16 mode, etc.) corresponding to a motion estimation unit for which the examination has not been performed.

After performing the aforementioned processing for the "macro block modes" corresponding to all the motion estimation units, the hybrid predicting section 64 compares the hold SADs for the respective "macro block modes".

The hybrid predicting section 64 sets the "macro block mode" with the smallest SAD as the "macro block-mode (INTER 16×16 mode, etc.)" using the inter-frame prediction of the macro block of the interest, and holds the set SAD.

The hybrid predicting section 64 compares the first SAD in the case of performing the motion compensated inter-frame prediction, with the second SAD in the case of performing the intra-frame pixel value prediction for the entire macro block of interest sent by the spatial predicting section 74.

The hybrid predicting section 64 sets the macro block mode which finally provides the smallest SAD as the "macro block mode" of the macro block of interest, and sends this "macro block mode" to the variable length encoding section 67 and the hybrid prediction decoding section 71.

When the "INTER mode" is selected as the "macro block mode", the hybrid predicting section 64 sends the "macro block mode", the "prediction mode selection state" of each sub-block, and the "motion vector" or "pixel prediction method", to the variable length encoding section 67 and the hybrid prediction decoding section 71.

The hybrid prediction decoding section 71 adds up the "predicted image block (sub-block basis)" sent by the motion compensating section 63 and "predictive residual signal (sub-block basis)", and sends the result to the loop filter 73, in the case where the "INTER mode" is selected as the "macro block mode" and the "inter-frame prediction mode" is selected for the sub-block of interest.

The hybrid prediction decoding section 71 adds up the "predicted image block (sub-block basis)" sent by the spatial predicting section 74 and the "predictive residual signal (sub-block basis)", and sends the result to the frame memory 72 through the loop filter 72, in the case where the "INTER mode" is selected as the "macro block mode" and the "intra-frame pixel value prediction mode" is selected for the sub-block of interest.

The loop filter 73 serves to suppress the deterioration such as the distortion of the sub-block, by performing filtering in sub-blocks for the result sent by the hybrid prediction decoding section 71.

In the video coding transmission system according to this embodiment, the syntax of the "INTER mode" is extended as follows to allow the "inter-frame prediction mode" and the "intra-frame pixel value prediction mode" to be mixed in a macro block.

Figure 16:
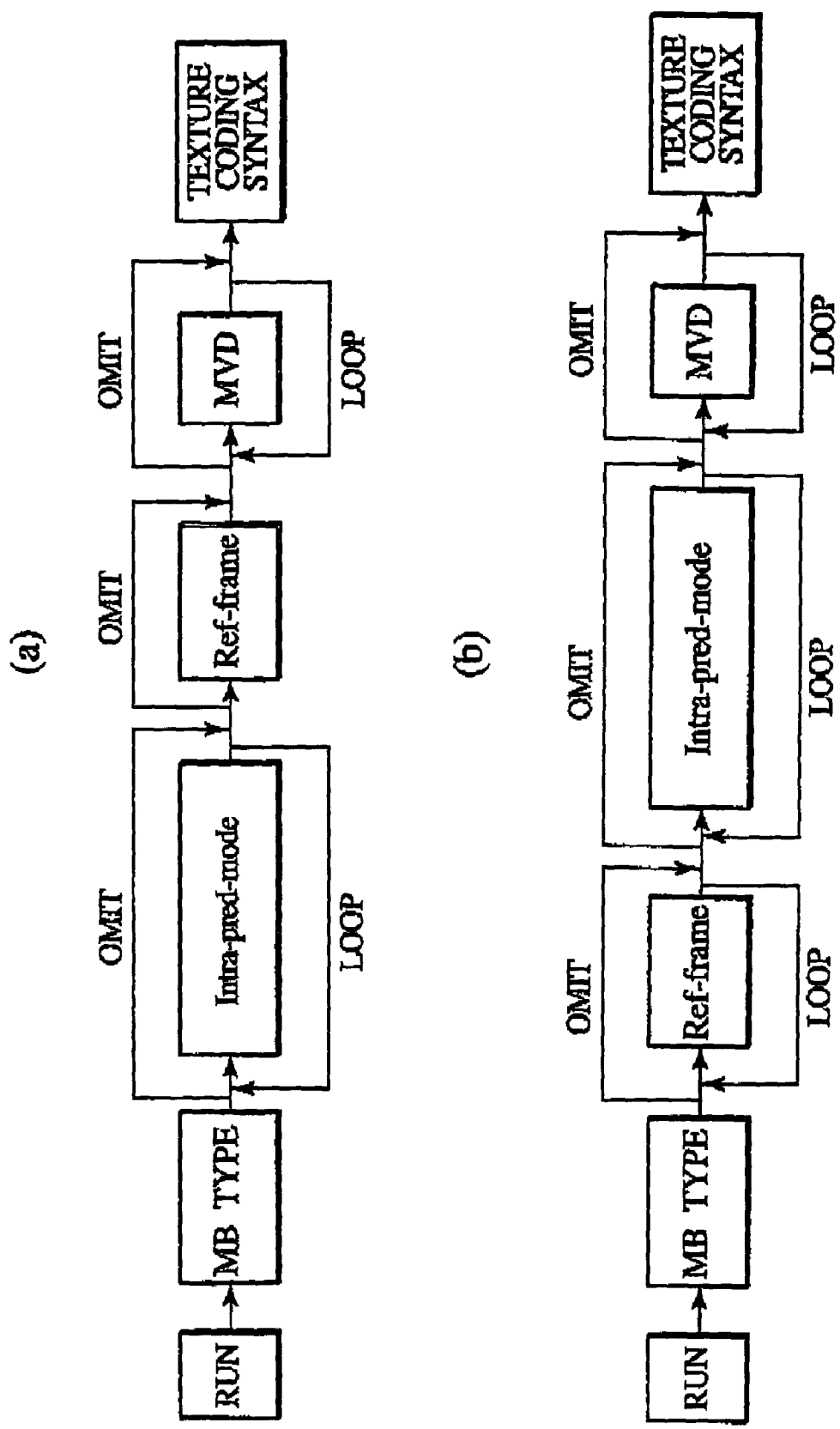
FIGS. 16(a) and 16(b) are views showing definitions of macro block syntax used :n the video coding transmission system according to the prior art and the embodiment of the present invention, respectively.

Specifically, in the video coding transmission system according to this embodiment, when the "INTER mode" is selected as the "macro block mode", the definitions of the "Ref_frame" and the syntax in macro block modes of the P picture in the H.26L coding system are extended as shown in FIGS. 16(*a*) and 16(*b*) and FIG. 17, to show the selection state that is the "inter-frame prediction mode" or "intra-frame pixel value prediction mode".

FIG. 16(*a*) shows a syntax in the macro block mode of P pictures in the conventional H.26L. In FIG. 16(*a*), the "Intra_pred_mode" indicates the prediction method (motion compensated inter-frame prediction or intra-frame pixel value prediction) selected for each orthogonal transformation block, in the case where the "INTRA 4×4 mode" is selected in the conventional H.26L coding system.

In the H.26L coding system, the "Ref_frame" indicates which reference frame is used for the macro block, since a "motion vector" can be estimated using a plurality of reference frames in the motion compensated inter-frame prediction.

The "MVD" indicates difference information of motion vectors. The "Texture Coding Syntax" indicates information such as the orthogonal transformation coefficients other than the aforementioned information.

The syntax shown in FIG. 16(*a*) is extended as shown in FIG. 16(*b*). The "Ref_frame" is transmitted as many times as the number of sub-blocks which is discriminated by the "macro block mode" indicated by the "MB_type".

The definition of the "Ref_frame" extended therefor is shown in FIG. 17. In FIG. 17, the maximum number of reference frames is "5". The code next to the code indicating the "5" is designed to indicate the "intra-frame prediction mode".

In the H.26L coding system, the maximum number of reference frames is variable and can take a value other than "5". Herein, the maximum number of reference frames is previously known in the encoder 60 and the decoder 80, and it is considered that similar setting information is transmitted in advance in actual applications.

Accordingly, if the code next to the code indicating the maximum number of reference frames is designed to be assigned to the code indicating the "intra-frame prediction mode", the extended "Ref_frame" can be uniquely defined in the encoder 60 and the decoder 80 despite the maximum number of reference frames.

Accordingly, the selection state of the "inter-frame prediction mode" or "intra-frame pixel value prediction mode" for each sub-block is transmitted by using the "Ref_frame".

As a result, the "inter-frame prediction mode" and the "intra-frame pixel value prediction mode" are allowed to be mixed in the macro block in which the "INTER mode" is selected.

Moreover, the "Ref_frame" is designed to be transmitted before the "Intra_pred_mode", since the selection state that is the "inter-frame prediction mode" or "intra-frame prediction mode" is discriminated by the "Ref_frame". Moreover, it is designed to transmit "Intra_pred_mode" as many times as the number of sub-blocks of the "intra-frame prediction mode"

indicated by the "Ref_frame", in the case where the "Ref_frame" indicates the presence of sub-blocks of the "intra-frame prediction mode".

Transmitting the "Ref_frame" before the "Intra_pred_mode" allows to send the syntax elements of each mode with no waste, even in the case where there is no need for information concerning the inter-frame prediction mode such as the "MVD" or information concerning the intra-frame pixel value prediction mode such as the "Intra_pred_mode".

In this case, the "Ref_frame" is transmitted for each sub-block unlike the case of the conventional H.26L coding system.

Accordingly, it becomes possible to select the "inter-frame prediction mode" or "intra-frame pixel value prediction mode" for each sub-block as well as to select a reference frame for each sub-block, which was selected for each macro block in the case of the conventional H.26L coding system.

The configuration of the decoder 80 according to this embodiment is the same as that of the decoder 80 according to the Embodiment 2 except using sub-blocks that are the motion estimation unit instead of sub-blocks of 4×4 pixels Operation of Video Coding Transmission System According to Embodiment 3

Figure 18:
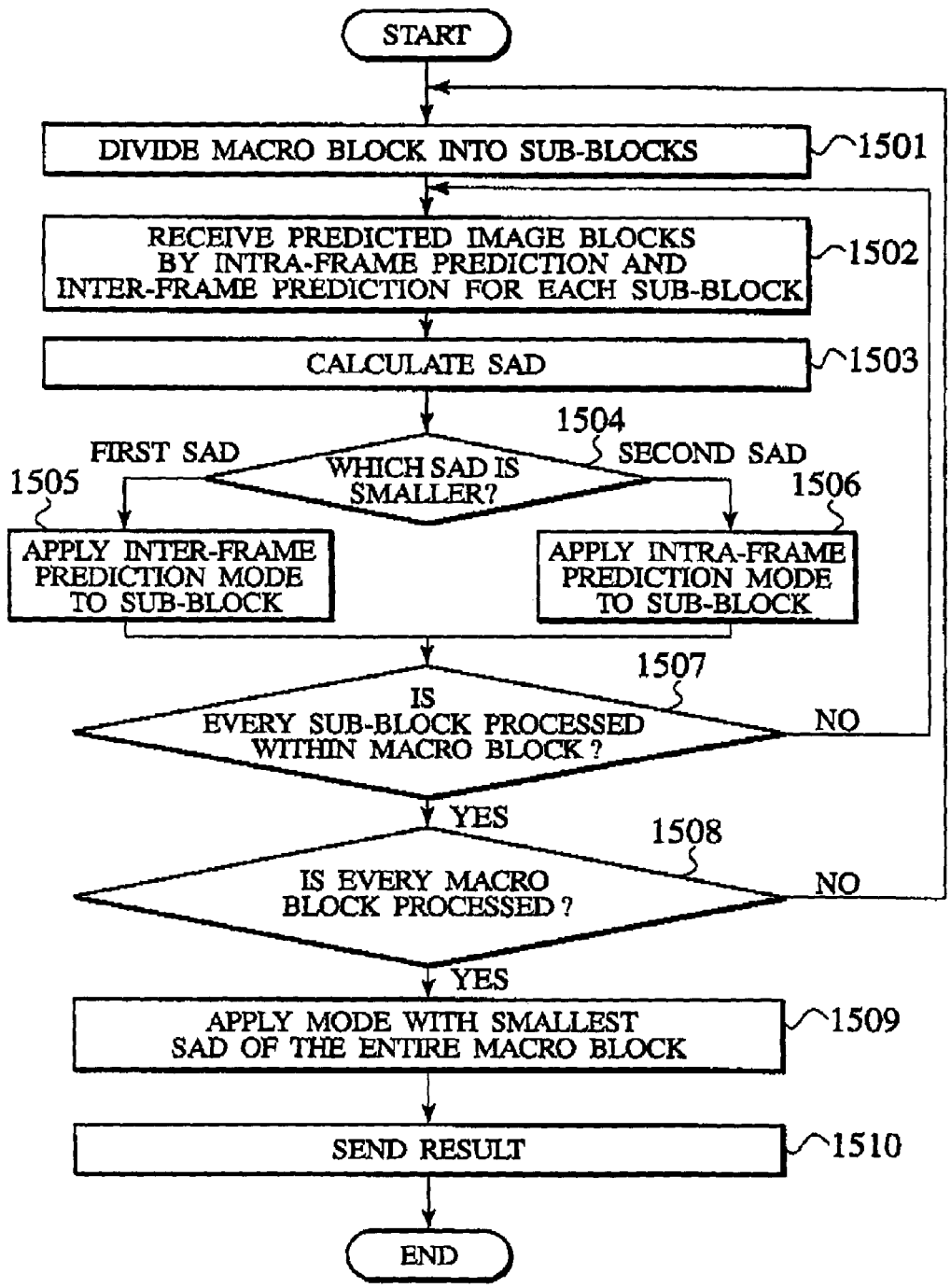
FIG. 18 is a flowchart showing processing in the hybrid predicting section of the encoder used in the video coding transmission system according to the embodiment of the present invention.

The operation of the video coding transmission system having the aforementioned configuration will be described with reference to FIG. 18. FIG. 18 is a flowchart showing processing in the hybrid predicting section 64 of the encoder 60 in this embodiment. Hereinafter, a description will be given of the operation of the video coding transmission system focusing on the operation of the hybrid predicting section 64 of the encoder 60.

As shown in FIG. 18, the hybrid predicting section 64 divides the macro block sent by the inputting section 61 into sub-blocks (corresponding to the motion estimation unit) in step 1501.

In step 1502, the hybrid predicting section 64 receives the predicted image block obtained by using the inter-frame prediction and the predicted image block obtained by using the intra-frame pixel value prediction from the motion compensating section 63 and the spatial predicting section 74, respectively.

In step 1503, the hybrid predicting section 64 calculates the first SAD between the macro block sent by the inputting section 61 and the predicted image block obtained by using the inter-frame prediction, and the second SAD between the macro block sent by the inputting section 61 and the predicted image block obtained by using the intra-frame pixel value prediction.

In stop 1504, the hybrid predicting section 64 compares the aforementioned first with second SADs for each sub-block. When the first SAD is smaller, the hybrid predicting section 64 sets the prediction mode of the sub-block of interest to the "inter-frame prediction mode" in step 1505. When the second SAD is smaller, the hybrid predicting section 64 sets the prediction mode of the sub-block of interest to the "intra-frame pixel value prediction mode" in step 1506.

In step 1507, the hybrid predicting section 64 judges whether or not the selection of the prediction mode is performed for every sub-block within the macro block of interest. When the selection is not performed for every sub-block, the hybrid predicting section 64 returns to the step 1502 and performs the selection of the prediction mode for the rest of the sub-blocks.

When the selection of the prediction mode is performed for every sub-block, the hybrid predicting section 64 judges whether or not the aforementioned selection is performed for every macro block mode (INTER 16×16 mode, etc.) in the macro block of interest in step 1508. When the aforementioned selection is not performed for every macro block mode, the hybrid predicting section 64 returns to the step 1501 and performs the aforementioned selection of the prediction mode for the rest of the macro block modes.

When the selection of the prediction mode is performed for every sub-block and every macro block mode, the hybrid predicting section 64 compares the sums of the SADs for the entire macro block of interest in the respective macro block modes in step 1509.

Moreover, the hybrid predicting section 64 also compares the sums of the SADs with the SAD in the case of performing the intra-frame pixel value prediction for the entire macro block (16×16 pixels) by the spatial predicting section 74.

The hybrid predicting section 64 applies the "macro block mode" providing the smallest SAD as the "macro block mode" of the macro block of interest.

In step 1510, the hybrid predicting section 64 sends this "macro block mode" to the variable length encoding section 67 and the hybrid prediction decoding section 71.

Herein, when the "INTER mode" including a sub-block of the "intra-frame prediction mode" is selected as the "macro block mode", the hybrid predicting section 64 sends the "macro block mode", the "prediction mode selection states" of the individual sub-blocks, and the "motion vector", or "pixel value prediction methods", to the variable length encoding section 67 and the hybrid prediction decoding section 71.

The video coding transmission system according to this embodiment has been described as the configuration compliant with ITU-T H.26L. However, the present invention is not limited to this configuration and applicable to various video coding transmission systems which perform a coding process in units equivalent to the macro blocks (first image blocks) using the prediction modes of the "inter-frame prediction mode (first prediction mode)" and the "intra-frame prediction mode (second prediction mode)".

Moreover, the method of discriminating the "inter-frame prediction mode" and the "intra-frame prediction mode" for each sub-block is not limited to the configuration shown in this embodiment and employs various syntaxes indicating which of the "inter-frame prediction mode" or the "intra-frame prediction mode is applied to each sub-block (second image block) within the macro block (first image block)".

It is conceivable that the method of discriminating the "inter-frame prediction mode" and the "intra-frame prediction mode" for each sub-block is multiplexed with various pieces of information transmitted in sub-blocks and transmitted like the "Ref_frame" in this embodiment.

For example, when the sub-block of interest is set to the "intra-frame prediction mode", the method can be indicated by a special vector value or difference vector value using the motion vector difference information (MVD).

Moreover, the information for discriminating the "inter-frame prediction mode" and the "intra-frame prediction mode" may be transmitted separately from the "Ref_frame" and the "MVD" by defining new information to be transmitted in sub-blocks.

In addition, it can be designed to set a special code, namely, the escape code to the coding code of the "MVD" and to indicate that the prediction mode is the "intra-frame prediction mode" when this code is transmitted.

Note that, in this embodiment, there could be some cases where the "intra-frame prediction mode" is selected for every sub-block when the "INTER mode" is selected as the macro block mode.

The coding result in such a case is not necessarily the same as that in the case where the "INTRA mode" is selected as the macro block mode because of the different information such as the, "pixel value prediction method".

Therefore, the presence of such a "macro block mode" may be permitted.

However, in this case, there are a plurality of macro block modes using intra-frame prediction with no variation in the prediction method (motion compensated inter-frame prediction or intra-frame pixel value prediction).

In order to prevent such a situation, the presence of the plurality of macro block modes using the intra-frame prediction may be avoided by forbidding the "INTER mode" in which every sub-block is the "intra-frame prediction mode" or by forbidding the "INTRA mode" as the "macro block mode".

Function and Effects of Video Coding Transmission System According to Embodiment 3

With the video coding transmission system according to the Embodiment 3, the hybrid predicting section 64 can optimally generate the predictive residual signals in which the spatial redundancy or the temporal redundancy is reduced from the sub-blocks. Accordingly, the efficient coding can be performed even in the case where the portion which is desirable to be encoded with the inter-frame prediction mode and the portion which is desirable to be encoded with the intra-frame prediction mode are mixed within a macro block.

(Others)

Figure 19:
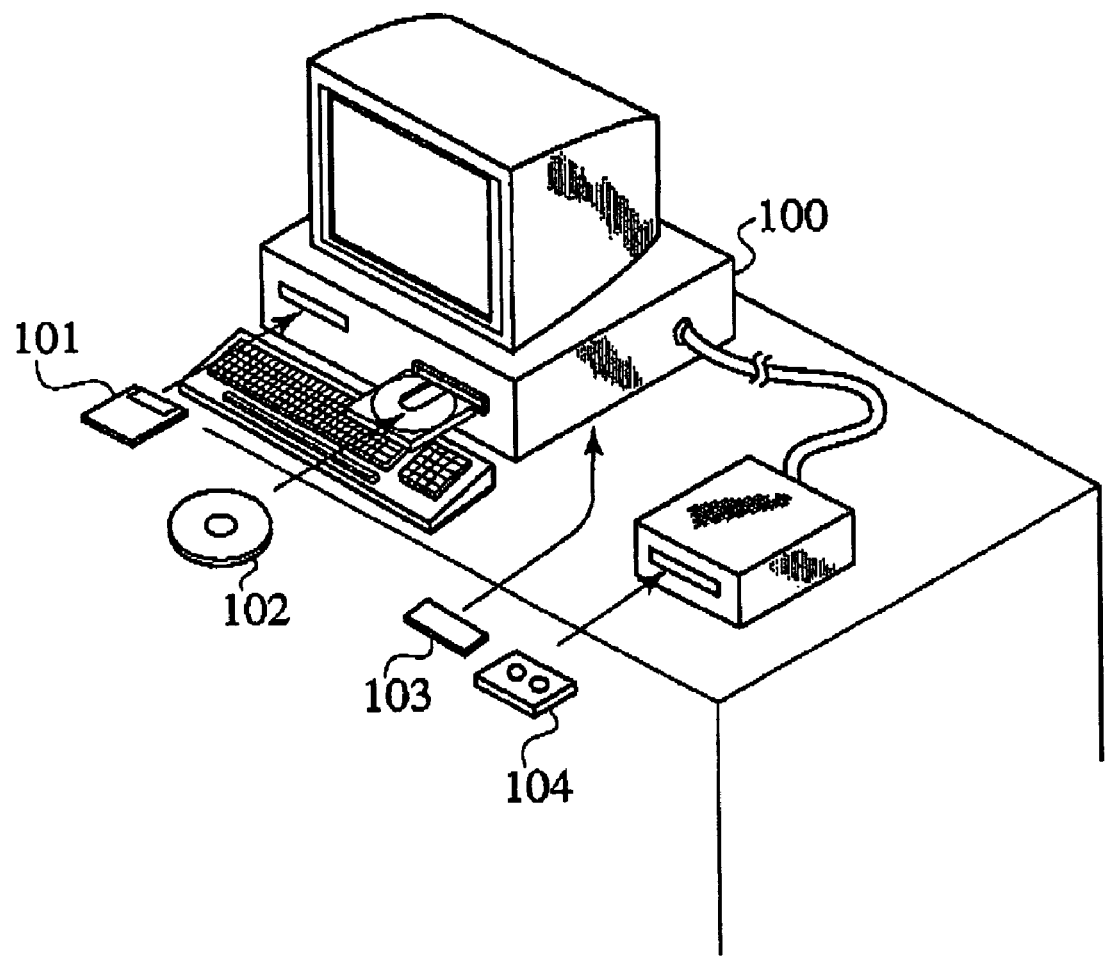
FIG. 19 is a view showing computer-readable recording media which record a program functioning as the video coding transmission system according to the present invention.

A program causing a computer 100 to execute functions of the encoders 20 and 60 and the decoders 40 and 80 according to the aforementioned Embodiments 1 to 3 can be recorded in a computer-readable recording medium. As shown in FIG. 19, this computer-readable recording medium is, for example, a floppy disk 101, a compact disk 102, an IC chip 103, a cassette tape 104, or the like. This computer readable recording medium with the program recorded can facilitate retention, delivery, sales, and the like of the program.

INDUSTRIAL APPLICABILITY

As described above, according to the present invention, it is possible to allow the portion which is subjected to coding with the inter-frame prediction mode and the portion which is subjected to the intra-frame prediction mode to be mixed in one macro block by switching the prediction modes without changing the frame work of macro blocks.

The invention claimed is:

1. An encoder for encoding each first image block of a video, comprising:
   prediction mode selection information generating means, including
      means for generating a plurality of first image blocks from the video,
      means for generating a plurality of second image blocks from each of the plurality of first image blocks,
      means for generating a prediction mode selection information for each second image block of a selected first image block, the prediction mode selection information indicates that a first prediction mode to reduce temporal redundancy is applied or that a second prediction mode to reduce spatial redundancy is applied,
   means for generating at least one of
      a first macro block mode for the selected first image block which indicates that the first prediction mode is applied to each of the second image blocks of the selected first image block,
      a second macro block mode for the selected first image block which indicates that the second prediction mode is applied to each of the second image blocks of the selected first image block, and
      a third macro block mode for the selected first image block which indicates that the selected first image block includes at least one second image block to which the first prediction mode is applied and at least one second image block to which the second prediction mode is applied;
   predictive residual signal generating means for generating a predictive residual signal by applying the selected first or second prediction mode to each of the second image blocks of the selected first image block; and
   transmitting means for encoding and transmitting a macro block mode generated for the selected first image block and the predictive residual signal, wherein
   said transmitting means encodes and transmits one motion vector along with the third macro block mode and the predictive residual signal, when the third macro block mode for the selected image block is generated.

2. The encoder according to claim 1, wherein the transmitting means encodes and transmits prediction mode related information necessary for a coding process in the first or second prediction mode.

3. The encoder according to claim 2, wherein
   the predictive residual signal generating means generates the predictive residual signal from each of the second image blocks of the selected first image block by motion compensated inter-frame prediction using a motion vector, when the first prediction mode is selected to be applied, and
   the predictive residual signal generating means generates the predictive residual signal from each of the second image blocks of the selected first image block by intra-frame prediction, when the second prediction mode is selected to be applied.

4. The encoder according to claim 3, wherein the transmitting means encodes and transmits information indicating the motion vector as the prediction mode related information, when the first or third macro block mode for the selected first image block is generated.

5. The encoder according to claim 2, wherein the predictive residual signal generating means generates the predictive residual signal by motion compensated inter-frame prediction using a same motion vector within the selected first image block, when the first or third macro block mode for the selected first image block is generated.

6. The encoder according to claim 4, wherein the transmitting means transmits the prediction mode selection information for each of the second image blocks of the selected first image block before the prediction mode related information, when the third macro block mode for the selected first image block is generated.

7. The encoder according to claim 2, wherein
   the predictive residual signal generating means generates the predictive residual signal from each of the second image blocks of the selected first image block by a pixel value prediction method using a value of a pixel adjacent to each of the second image blocks of the selected first image block, when the second or third macro block mode is generated for the selected first image block, and the transmitting means encodes and transmits the pixel value prediction method as the prediction mode related information.

8. The encoder according to claim 2, wherein the transmitting means encodes and transmits the prediction mode related information in association with the prediction mode selection information.

9. The encoder according to claim 2, wherein the transmitting means does not transmit the prediction mode related information of the first prediction mode, when the first prediction mode is not applied to each of the second image blocks of the selected first image block.

10. A decoder to decode a video, comprising:
means for receiving a plurality of first image blocks, each including a plurality of second image blocks,
prediction mode selection information decoding means, including
means for decoding
a prediction mode selection information for each second image block of a selected first image block, the prediction mode selection information indicates that a first prediction mode to reduce temporal redundancy is applied or that a second prediction mode to reduce spatial redundancy is applied,
means for decoding at least one of
a first macro block mode for the selected first image block which indicates that the first prediction mode is applied to each of the second image blocks of the selected first image block,
a second macro block mode for the selected first image block which indicates that the second prediction mode is applied to each of the second image blocks of the selected first image block, and
a third macro block mode for the selected first image block which indicates that the selected first image block includes at least one second image block to which the first prediction mode is applied and at least one second image block to which the second prediction mode is applied; and
video decoding means for decoding each of the second image blocks of the selected first image block of the video based on the first or second prediction mode selected by the prediction mode selection information, wherein
the video decoding means decodes the second image blocks of the selected first image block by using one motion vector, when the third macro block mode for the selected image block is decoded.

11. The decoder according to claim 10, further comprising prediction mode related information decoding means for decoding prediction mode related information necessary for a coding process in the first or second prediction mode, and
wherein the video decoding means decodes the video using the prediction mode related information.

12. The decoder according to claim 11, wherein
the video decoding means decodes each of the second image blocks of the selected first image block of the video from the predictive residual signal by motion compensated inter-frame prediction, when the first prediction mode is selected to be applied by the prediction mode selection information, and
the video decoding means decodes each of the second image blocks of the selected first image block of the video from the predictive residual signal by intra-frame prediction, when the second prediction mode is selected to be applied by the prediction mode selection information.

13. The decoder according to claim 12, wherein the prediction mode related information decoding means decodes information indicating a motion vector as the prediction mode related information, when the first or third macro block mode for the selected first image block is generated.

14. The decoder according to claim 12, wherein the prediction mode selection information decoding means decodes the prediction mode selection information for each of the second image blocks of the selected first image block before the prediction mode related information, when the third macro block mode for the selected first image block is generated.

15. The decoder according to claim 11, wherein the video decoding means decodes the video using motion compensated inter-frame prediction by a same motion vector within the first image block, when the first or third macro block mode for the selected first image block is generated.

16. The decoder according to claim 11, wherein
the prediction mode related information decoding means decodes a pixel value prediction method related to the second image block as the prediction mode related information, when the second or third macro block mode for the selected first image block is generated, and
the video decoding means decodes the video using the pixel value prediction method.

17. The decoder according to claim 10, wherein the prediction mode selection information decoding means decodes the prediction mode selection information of each of the second image blocks of the selected first image block.

18. The decoder according to claim 11, wherein the prediction mode selection information is encoded in association with the prediction mode related information.

19. The decoder according to claim 11, wherein the prediction mode related information decoding means does not decode the prediction mode related information of the first prediction mode, when the prediction mode selection information indicates that the first prediction mode is not applied to each of the second image blocks of the selected first image block.

20. An encoding method of encoding each of first image blocks of a video, comprising:
a step A of generating prediction mode selection information, including
dividing the video into a plurality of first image blocks,
dividing each of the said plurality of first image blocks into a plurality of second image blocks,
generating the prediction mode selection information for each second image block of a selected first image block, the prediction mode selection information indicates that a first prediction mode to reduce temporal redundancy is applied or that a second prediction mode to reduce spatial redundancy is applied,
generating at least one of
a first macro block mode for the selected first image block which indicates that the first prediction mode is applied to each of the second image blocks of the selected first image block,
a second macro block mode for the selected first image block which indicates that the second prediction mode is applied to each of the second image blocks of the selected first image block, and
a third macro block mode for the selected first image block which indicates that the selected first image block includes at least one second image block to which the first prediction mode is applied and at least one second image block to which the second image mode is applied;

a step B of generating a predictive residual signal by applying the selected first or second prediction mode to each of the second image blocks of the selected first image block; and a step C of encoding and transmitting a macro block mode generated for the selected first image block and the predictive residual signal, and encoding and transmitting one motion vector along with the third macro block mode and the predictive residual signal, when the third macro block for the selected first image block is generated.

21. The encoding method according to claim 20, wherein, in the step C, prediction mode related information necessary for a coding process in the first or second prediction mode is encoded and transmitted.

22. The encoding method according to claim 20, wherein, in the step B, the predictive residual signal is generated from the each of the second image blocks of the selected first image block by motion compensated inter-frame prediction using a motion vector, when the first prediction mode is selected to be applied, and in the step B, the predictive residual signal is generated from the each of the second image blocks of the selected first image block by the inter-frame prediction, when the second prediction mode is selected to be applied.

23. The encoding method according to claim 22, wherein, in the step C, information indicating the motion vector is encoded and transmitted as the prediction mode related information, when the first or third macro block mode for the selected first image block is generated.

24. The encoding method according to claim 21, wherein, in the step B, the predictive residual signal is generated by motion compensated inter-frame prediction using a same motion vector within the selected first image blocks, when the first or third macro block mode for the selected first image block is generated.

25. The encoding method according to claim 23, wherein, in the step C, the prediction mode selection information for each of the second image blocks of the selected first image block is transmitted before the prediction mode related information, when the third macro block mode for the selected first image block is generated.

26. The encoding method according to claim 21, wherein, in the step B, the predictive residual signal is generated from each of the second image blocks of the selected first image block by a pixel value prediction method using a value of a pixel adjacent to each of the second image blocks of the selected first image block, when the second or third macro block mode for the selected first image block is generated, and in the step C, the pixel value prediction method is encoded and transmitted as the prediction mode related information.

27. The encoding method according to claim 21, wherein, in the step C, the prediction mode related information is encoded and transmitted in association with the prediction mode selection information for each of the second image blocks of the selected first image block.

28. The encoding method according to claim 21, wherein, in the step C, the prediction mode related information of the first prediction mode is not transmitted, when the first prediction mode is not applied to each of the second image blocks of the selected first image block.

29. A decoding method for decoding a video, comprising:

a step A of receiving a plurality of first image blocks, each including a plurality of second image blocks, a step B of decoding prediction mode selection information for each second image block of a selected first image block which indicates that a first prediction mode to reduce temporal redundancy is applied or that a second prediction mode to reduce spatial redundancy is applied, and decoding at least one of a first macro block mode for the selected first image block which indicates that the first image prediction mode is applied to each of the second image blocks of the selected first image block, a second macro block mode for the selected first image block which indicates that the second image prediction mode is applied to each of the second image blocks of the selected first image block, and a third macro block mode for the selected first image block which indicates that the selected first image block includes at least one second image block to which the first prediction mode is applied and at least one second image block to which the second prediction mode is applied; and a step C of decoding each of the second image blocks of the selected first image block of the video, based on the first or second prediction mode selected by the prediction mode selection information, wherein the step C of decoding includes decoding the second image blocks of the selected first image block by using one motion vector, when the third macro block mode for the selected image block is decoded.

30. The decoding method according to claim 29, wherein in the step B, prediction mode related information necessary for a coding process in the first or second prediction mode is decoded, and in the step C, the video is decoded using the prediction mode related information.

31. The decoding method according to claim 30, wherein the video is decoded using motion compensated inter-frame prediction in the step C, when the first prediction mode is selected to be applied by the prediction mode selection information in the step B, and the video is decoded using intra-frame prediction in the step C, when the second prediction mode is selected to be applied by the prediction mode selection information in the step B.

32. The decoding method according to claim 31, wherein, in the step B, information indicating a motion vector is decoded as the prediction mode related information, when the first prediction mode is selected to be applied by the prediction mode selection information.

33. The decoding method according to claim 30, wherein, in the step B, the prediction mode selection information for each of the second image blocks of the selected first image block is decoded before the prediction mode related information, when the third macro block mode for the selected first image block is generated.

34. The decoding method according to claim 31, wherein, in the step C, the video is decoded using motion compensated inter-frame prediction by a same motion vector within the first image block, when the first or third macro block mode for the selected first image block is generated.

35. The decoding method according to claim 30, wherein in the step B, a pixel value prediction method related to the second image block is decoded as the prediction mode related information, when the second or third macro block mode for the selected first image block is generated, and in the step C, the video is decoded using the pixel value prediction method.

36. The decoding method according to claim 29, wherein, in the step A, the prediction mode selection information of each of the second image blocks of the selected first image block is decoded.

37. The decoding method according to claim 30, wherein the prediction mode selection information is encoded in association with the prediction mode related information for each second image block of the selected fist image block.

38. The decoding method according to claim 30, wherein, in the step B, the prediction mode related information of the first prediction mode is not decoded, when the prediction mode selection information indicates that the first prediction mode is not applied to at least one of the second image blocks of the selected first image block.

39. A computer readable recording medium including computer readable instructions that when executed by a computer cause the computer to function as an encoder and to perform steps comprising:

dividing a video into a plurality of first image blocks;

dividing each of the plurality of first image blocks into a plurality of second image blocks;

generating a prediction mode selection information for each second image block of a selected first image block, the prediction mode selection information indicates that a first prediction mode to reduce temporal redundancy is applied or that a second prediction mode to reduce spatial redundancy is applied, generating at least one of a first macro block mode for the selected first image block which indicates that the first prediction mode is applied to each of the second image blocks of the selected first image block, a second macro block mode for the selected first image block which indicates that the second prediction mode is applied to each of the second image blocks of the selected first image block, and a third macro block mode for the selected first image block which indicates that the selected first image block includes at least one second image block to which the selected first prediction mode is applied and at least one second image block to which the second prediction mode is applied;

generating a predictive residual signal by applying the selected first or second prediction mode to each of the second image blocks of the selected first image blocks;

encoding and transmitting a macro block mode generated for the selected first image block and the predictive residual signal; and encoding and transmitting one motion vector along with the third macro block mode and the predictive residual signal, when the third macro block mode for the selected first image block is generated.

40. A computer readable recording medium including computer readable instructions that when executed by a computer cause the computer to function as a decoder and to perform steps comprising:

decoding a prediction mode selection information for each second image block of a selected first image block, the prediction mode selection information indicates that a first prediction mode to reduce temporal redundancy is applied or that a second prediction mode to reduce spatial redundancy is applied;

decoding at least one of a first macro block mode for the selected first image block which indicates that the first prediction mode is applied to each of the second image blocks of the selected first image block, a second macro block mode for the selected first image block which indicates that the second prediction mode is applied to each of the second image blocks of the selected first image block, and a third macro block mode for the selected first image block which indicates that the selected first image block includes at least one second image block to which the first prediction mode is applied and at least one second image block to which the second prediction mode is applied; and decoding each of the second image blocks of the selected first image block of a video based on the first or second prediction mode selected by the prediction mode selection information, wherein the second image blocks of the selected first image block is decoded by using one motion vector, when the third macro block mode for the selected image block is decoded.

41. A video coding transmission system comprising:

an encoder, including means for dividing the video into a plurality of first image blocks, means for dividing each of said plurality of first image blocks into a plurality of second image blocks, means for generating a prediction mode selection information for each second image block of a selected first image block, the prediction mode selection information indicates that a first prediction mode to reduce temporal redundancy is applied or that a second prediction mode to reduce spatial redundancy is applied, means for generating at least one of a first macro block mode for the selected first image block which indicates that the first prediction mode is applied to each of the second image blocks of the selected first image block, a second macro block mode for the selected first image block which indicates that the second prediction mode is applied to each of the second image blocks of the selected first image block, and a third macro block mode for the selected first image block which indicates that the selected first image block includes at least one second image block to which the first prediction mode is applied and at least one second image block to which the second prediction mode is applied, predictive residual signal generating means for generating a predictive residual signal by applying the selected first or second prediction mode to each of the second image blocks of the selected first image block, transmitting means for encoding and transmitting a macro block mode generated for the selected first image block and the predictive residual signal, wherein the transmitting means encodes and transmits one motion vector along with the third macro block mode and the predictive residual signal, when the third macro block mode for the selected first image block is generated; and a decoder, including
prediction mode selection information decoding means for decoding the prediction mode selection information of each of the second image blocks of a selected first image block; and
video decoding means for decoding each of the second image blocks of the selected first image block of the video, based on the first or second prediction mode selected by the prediction mode selection information.

42. A video coding transmission method comprising the steps of:
dividing the video into a plurality of first image blocks;
dividing each of said plurality of first image blocks into a plurality of second image blocks;
encoding and transmitting a macro block mode generated for a selected first image block and a predictive residual signal in a coding process, the macro block mode indicating at least one of
a first macro block mode for the selected first image block which indicates that a first prediction mode to reduce temporal redundancy is applied to each of the second image blocks of the selected first image block,
a second macro block mode for the selected first image block which indicates that a second prediction mode to reduce spatial redundancy is applied to each of the second image blocks of the selected first image block, and
a third macro block mode for the selected first image block which indicates that the selected first image block includes at least one second image block to which the first prediction mode is applied and at least one second image block to which the second prediction mode is applied;
encoding and transmitting one motion vector along with the third macro block mode and the predictive residual signal, when the third macro block mode for the selected first image block is generated;
the predictive residual signal being generated by applying the selected first or second prediction mode to each of the second image blocks of the selected first image block;
decoding the prediction mode selection information of each of the second image blocks of the selected first image block in a decoding process; and
decoding each of the second image blocks of the selected first image block of the video, based on the first or second prediction mode selected by the prediction mode selection information.

* * * * *